(12) United States Patent
Calahan et al.

(10) Patent No.: US 10,366,517 B2
(45) Date of Patent: Jul. 30, 2019

(54) SYSTEM, METHOD AND COMPUTER PROGRAM PRODUCT FOR INTERACTING WITH A PROCESS DIAGRAM

(71) Applicant: salesforce.com, inc., San Francisco, CA (US)

(72) Inventors: Patrick Calahan, San Francisco, CA (US); Shilpa Goel, Mountain View, CA (US); Varadarajan Rajaram, San Francisco, CA (US); David Park, San Francisco, CA (US); Miguel Canizares, San Francisco, CA (US); Venkadeshkumar Dhandapani, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 164 days.

(21) Appl. No.: 14/957,482

(22) Filed: Dec. 2, 2015

(65) Prior Publication Data

US 2016/0225172 A1    Aug. 4, 2016

Related U.S. Application Data

(63) Continuation of application No. 12/751,906, filed on Mar. 31, 2010, now Pat. No. 9,239,722.

(51) Int. Cl.
| | | |
|---|---|---|
| G06F 3/048 | (2013.01) | |
| G06T 11/20 | (2006.01) | |
| G06F 9/44 | (2018.01) | |
| G06F 8/34 | (2018.01) | |
| G06F 3/0482 | (2013.01) | |
| G06F 3/0484 | (2013.01) | |
| G06T 11/60 | (2006.01) | |

(52) U.S. Cl.
CPC .......... *G06T 11/206* (2013.01); *G06F 3/0482* (2013.01); *G06F 3/04842* (2013.01); *G06F 3/04845* (2013.01); *G06F 8/34* (2013.01); *G06F 9/44* (2013.01); *G06T 11/60* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — William C Trapanese
(74) *Attorney, Agent, or Firm* — Meyertons, Hood, Kivlin, Kowert & Goetzel, P.C.

(57) ABSTRACT

In accordance with embodiments, there are provided mechanisms and methods for interacting with a process diagram. These mechanisms and methods for interacting with a process diagram may allow for a user's enhanced interactive experience with the process diagram. The ability of embodiments to provide such enhancements may allow for improved navigation of the process diagram, searching of the process diagram, editing of the process diagram, etc.

20 Claims, 29 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 7,904,322 B2 * | 3/2011 | Gauger ............... G06Q 10/00 705/7.13 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 * | 4/2005 | Brodersen ............... G06Q 10/06 705/500 |
| 2005/0223022 A1 | 10/2005 | Weissman et al. |
| 2006/0021019 A1 | 1/2006 | Hinton et al. |
| 2007/0263010 A1 * | 11/2007 | Sripathi Panditharadhya ............ G06F 17/30259 345/619 |
| 2008/0120153 A1 * | 5/2008 | Nonemacher ............ G06F 8/10 705/7.26 |
| 2008/0120573 A1 * | 5/2008 | Gilbert ................ G06F 3/04817 715/835 |
| 2008/0249972 A1 | 10/2008 | Dillon |
| 2009/0063415 A1 | 3/2009 | Chatfield et al. |
| 2009/0070403 A1 * | 3/2009 | Jindani ................. H04L 63/102 709/202 |
| 2009/0100342 A1 | 4/2009 | Jakobson |
| 2009/0177744 A1 | 7/2009 | Marlow et al. |
| 2009/0204897 A1 * | 8/2009 | Sogge .................... G06Q 10/06 715/700 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |

(56) References Cited

U.S. PATENT DOCUMENTS

2015/0095162 A1 4/2015 Jakobson et al.
2015/0142596 A1 5/2015 Jakobson et al.
2015/0172563 A1 6/2015 Jakobson et al.

* cited by examiner

Campaign: Campaign Approval Process

| | | | |
|---|---|---|---|
| Process name | Campaign Approval Process | Active | No |
| Description | | Next Automated Approver Determined By | Manager of Record Submitter |
| Record Editability | Administrator ONLY | Allow Submitters to Recall Approval Requests | No |
| Approval Assignment Email Template | Workflow - Approvals | | |
| Initial Submitters | Campaign Owner | | |
| Created By | Admin User, 11/11/2008 10:39 AM | Modified By | Admin User, 1/12/2009 3:54PM |

① Entry Criteria

Lead.Application_Received__c = true
Lead.AnnualRevenue != null

② Initial Submission Actions

| Type | Name | Details |
|---|---|---|
| Task | Follow in 30 | Assign task to Owner, due 30 days after Lead.Created Date |
| Email Alert | New Application Alert | Send Leads: New assignment notification (SAMPLE) email to: User: admin@wf.ee.com |
| Field Update | pending approval | Update App__c with value: Pending |
| Outbound Message | SAP OBM | Send the fields:, Agent_Bonus__c, AnnualRevenue, App__c, Application_Received__c, City, Company, ConvertedAccountId, ConvertedContactId, ConvertedDate, ConvertedOpportunityId, Country, CreatedById, CreatedDate, Credit_Score__c, Depo__c, Deposit_Received__c, Deposit_Waived__c, Description, DoNotCall, Email, Id to endpoint: http://ghart-ws:8080 |
| Record Lock | | Lock the record from being edited |

③ Step 1: Income Check

| | |
|---|---|
| Description | |
| Reject Behavior | Final Rejection |

SYSTEM, METHOD AND COMPUTER PROGRAM PRODUCT FOR INTERACTING WITH A PROCESS DIAGRAM

CLAIM OF PRIORITY

This application is a continuation of U.S. application Ser. No. 12/751,906, filed Mar. 31, 2010, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to workflow tools, and more particularly to process diagrams.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional systems, process diagrams provide a user with useful workflow information. There is often a desire to enhance the experience a user has when interacting with a process diagram. For example, there is often a desire to enhance actions such as navigating the process diagram, searching the process diagram, editing the process diagram, etc. Unfortunately, conventional design and implementation of process diagrams fails to optimize such a user experience.

BRIEF SUMMARY

In accordance with embodiments, there are provided mechanisms and methods for interacting with a process diagram. These mechanisms and methods for interacting with a process diagram may allow for a user's enhanced interactive experience. The ability of embodiments to provide such enhancements may allow for improved navigation, searching, editing, and so forth of the process diagram.

In an embodiment and by way of example, a method is provided for interacting with a process diagram. In use, one or more steps are incorporated into a process diagram. Additionally, one or more states are incorporated into the process diagram, where the one or more steps are associated with the one or more states.

While the present invention is described with reference to an embodiment in which techniques for interacting with a process diagram are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 5A-FIG. 5E shows an exemplary printable view, in accordance with one embodiment.

FIG. 17 shows an exemplary overlay for adding a step in a process diagram interface, in accordance with one embodiment.

DETAILED DESCRIPTION

General Overview

Systems and methods are provided for interacting with a process diagram.

There is often a desire to enhance the experience a user has when interacting with a process diagram. For example, there is often a desire to enhance actions such as navigating the process diagram, searching the process diagram, editing the process diagram, etc.

Thus, mechanisms and methods are provided herein for interacting with a process diagram, where these mechanisms and methods for interacting with a process diagram may allow for a user's enhanced interactive experience with the process diagram. The ability of embodiments to provide such enhancements may allow for improved navigation of the process diagram, searching of the process diagram, editing of the process diagram, etc.

Next, mechanisms and methods for interacting with a process diagram will be described with reference to exemplary embodiments.

Figure 1:
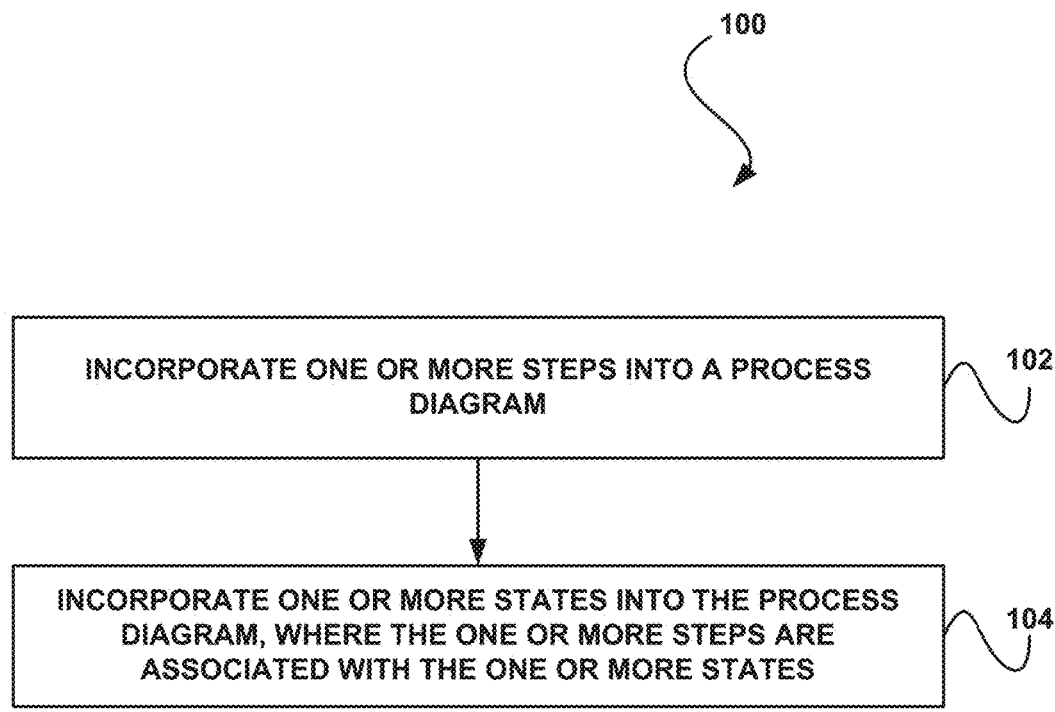
FIG. 1 shows a method for interacting with a process diagram, in accordance with one embodiment.

FIG. 1 shows a method 100 for interacting with a process diagram, in accordance with one embodiment. As shown, one or more steps are incorporated into a process diagram. See operation 102.

In the context of the present description, the process diagram may include any diagram that illustrates a process. For example, the process may include a workflow, a business operations process, a retail process, a manufacturing process, a hiring process, etc. In one embodiment, the process diagram may illustrate more than one process. Additionally, the steps that are incorporated into the process diagram may include any action capable of being performed during the process. For example, the steps may include performing a procedure, transmitting a communication, sending a notification, creating a document, etc.

Further, in another embodiment, the process diagram may include an image that is displayed and that comprises one or more objects representative of one or more elements within the process. For example, the diagram may include one or more geometric shapes (e.g., squares, circles, triangles, etc.), where each shape represents an element within the process. In another embodiment, the steps incorporated into the process diagram may be represented by a particular object. For example, each step in the process diagram may be represented by a rectangle.

Further still, in another embodiment, an expand control may be displayed on one or more of the steps. For example, a visual indicator may be associated with a step, where selecting the expand control may illustrate one or more additional elements associated with the step. In one embodiment, the additional elements associated with the step may include one or more subprocesses, one or more states, etc.

Also, in yet another embodiment, the steps may be incorporated into the process diagram automatically. For example, the process diagram may be automatically populated with the steps from a database or other source. In another embodiment, the steps may be incorporated into the process diagram manually. For example, a user may manually insert the steps into the process diagram using an interface, including a graphical user interface (GUI), a text interface, or any other interface by which a user can view, edit, search, navigate, and/or otherwise interact with the process diagram.

In addition, one or more states are incorporated into the process diagram, where the one or more steps are associated with the one or more states, as shown in operation 104. In one embodiment, the states may include a start state. For example, the states may include a visual representation for the start of the process in the process diagram. In another embodiment, the states may include one or more end states. For example, the states may include one or more visual representations for one or more possible endings of the process in the process diagram. Further, the states may be incorporated into the process diagram automatically and/or manually, as described hereinabove.

Further still, in one embodiment, the states may include an end result of one or more of the steps in the process diagram. In another embodiment, the states may include a start of one or more of the steps in the process diagram. Of course, the one or more steps may be associated with the one or more states in any manner.

Additionally, in one embodiment, the association between the one or more steps and the one or more states may be previously determined. Further, the incorporation of the one or more states may be based at least in part on the association between the one or more steps and the one or more states.

In yet another embodiment, one or more connections may exist between one or more steps and/or one or more states. For example, the performance of one step may lead to the performance of another step, and as a result, a connection may exist between the two steps. In another embodiment, the performance of one step may lead to an arrival at a particular state. In still another embodiment, a state may proceed with the performance of a particular step. As a result, a connection may exist between the associated state and step. In another embodiment, such a connection may be displayed by the use of a line, arrow, or other visual connector between the steps and/or the steps and states.

Additionally, in another embodiment, one or more criteria may be incorporated into the process diagram. In one embodiment, the criteria may include one or more conditional elements. In another example, the criteria may lead to different elements within the process diagram based on whether the criteria are met. For example, the criteria may include one or more actions that may have to be performed. If the actions are performed, the criteria may connect to a particular element of the process diagram. However, if one or more of the actions are not performed, the criteria may connect to a different element of the process diagram. In another embodiment, the criteria may be expressed as a formula.

Further, in another embodiment, one or more entities may be incorporated into the process diagram. In one embodiment, the entities may include a person, position, division, etc. associated with one or more elements of the process diagram. For example, the entities may include a manager, a customer, a name of a person, a sales division, a delegate, etc. In another embodiment, the entity may be associated with an approval action within the process diagram. For example, the entity may be in charge of one or more approval elements within the process diagram, and the entity may lead to different elements within the process diagram based on whether the one or more approval elements are met. In another example, the entities may include one or more approver nodes.

Also, in one embodiment, one or more elements may be included (e.g. in an interface, etc.) for interacting with the process diagram. For example, a sidebar may be incorporated into an interface associated with the process diagram (e.g. an interface that is used to view the process diagram, edit the process diagram, etc.). In one embodiment, the sidebar may appear when one or more elements of the process diagram are selected by a user. In another embodiment, the sidebar may always appear with the process diagram. In yet another embodiment, the sidebar may be located on the top, bottom, left side, right side, or any other location of the interface associated with the process diagram. Additionally, in one embodiment, the sidebar may be used to incorporate one or more additional elements into the process diagram. For example, a user may select one or more elements from the sidebar and drag them onto the process diagram in order to incorporate them into the process diagram.

In another embodiment, the sidebar may be used to provide more information about one or more elements of the process diagram. For example, a user may hover over or select an element in the process diagram, and more information regarding that element may appear on the sidebar. In this way, the sidebar may assist in the interaction between a user and the process diagram, and may provide more details information about elements within the process diagram.

In yet another embodiment, a navigator component may be incorporated into the interface associated with the process diagram. For example, the navigator component may be included in the sidebar of the process diagram. In one embodiment, the navigator component may illustrate one or more elements of the process diagram. For example, the overall process diagram (e.g., an entirety of a process diagram, etc.) may be illustrated in the navigator component. Additionally, a user may interact with the navigator component in order to navigate through the process diagram. For example, the user may move a window located in the navigator component in order to move to a particular area in the process diagram encompassed by the window. In this way, a user may easily navigate the process diagram, and an overview of the process diagram may be clearly displayed.

Additionally, in one embodiment, a zoom capability may be incorporated into the interface associated with the process diagram. For example, the zoom capability may include the ability for a user to zoom in or out of the process diagram. For example, a zoom slider may be used to zoom in and/or out of the process diagram. In another embodiment, the process diagram may adjust to a location of the user. For example, the process diagram may be automatically centered after a user zooms in or out of the process diagram. Further, the navigator component may react to a zooming operation. For example, the window in the navigator component may enlarge to scale as a user zooms in to the process diagram, and the window may shrink to scale as the user zooms out of the process diagram. In this way, a user may easily move in and out of the process diagram.

Further, in one embodiment, a search component may be incorporated into the interface associated with the process diagram. For example, a user may input one or more characters into the search component, and the search component may search for the one or more characters input by the user within the process diagram. In another embodiment, the search component may enable the user to filter their search. In yet another embodiment, elements within the process diagram that match input search characters may be highlighted in the process diagram. For example, the process diagram may be grayed out except for the one or more elements that match the input search characters.

Further still, in another embodiment, one or more portions of the sidebar that match input search characters may be highlighted. In yet another embodiment, if an element of the process diagram contains one or more subprocesses, only the subprocesses that match input search characters may be highlighted. Further, in one embodiment, a user may view all elements that match input search characters, or may jump from one element that matches input search characters to another element that matches input search characters. Further still, in another embodiment, a window may automatically scroll to the next element if the next element is not currently visible. In this way, a user may easily search for one or more characters within the process diagram and the results of such search may be easily navigated.

Process Diagram Layout

Figure 2:
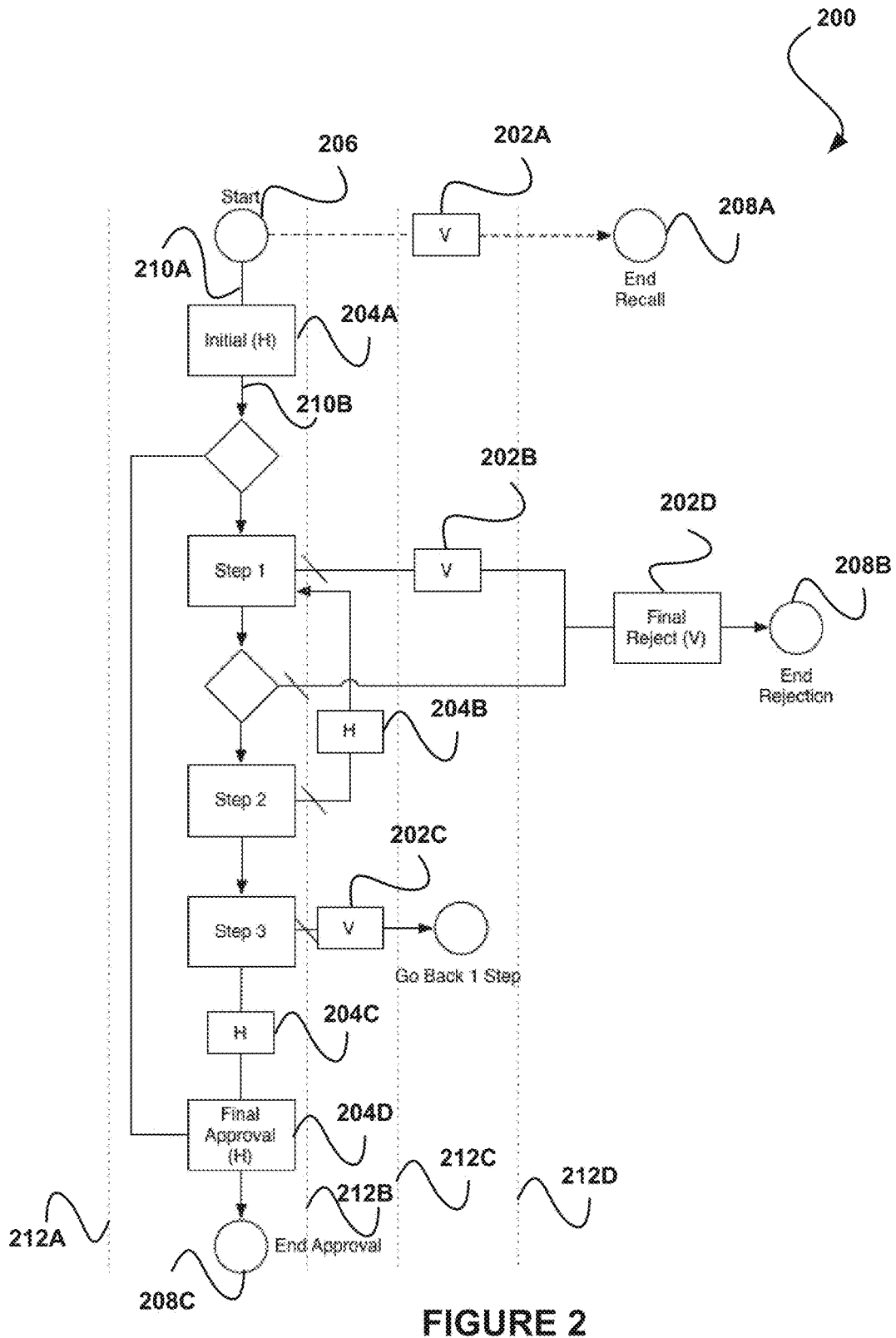
FIG. 2 shows an exemplary process diagram layout, in accordance with one embodiment.

FIG. 2 shows an exemplary process diagram layout 200, in accordance with one embodiment. As an option, the process diagram layout 200 may be implemented in the context of the functionality of FIG. 1. Of course, the process diagram layout 200 may be carried out in any desired environment. Further, the aforementioned definitions may apply during the present description.

As shown, the process diagram layout 200 includes a start state 206 and end states 208A-C. Additionally, the process diagram layout 200 includes elements 202A-D which can expand vertically to show additional features of the process diagram layout 200. Additionally, the process diagram layout 200 includes elements 204A-D which expand horizontally to show additional features of the process diagram layout 200. In one embodiment, if one or more of the elements of the process diagram layout 200 overlap upon expansion, the most recent element may be rendered on top of the element with which it overlaps. For example, if element 202C overlaps with element 204B when both are expanded, and element 202C was the most recently accessed element, then element 202C will be rendered on top of element 204B. Also, in one embodiment, the process diagram layout 200 may be substantially linear.

In addition, one or more virtual columns 212A-D are included in the process diagram layout 200. Such virtual columns 212A-D may assist with the placement of one or more elements within the process diagram layout 200.

Visual Design

Figure 3:
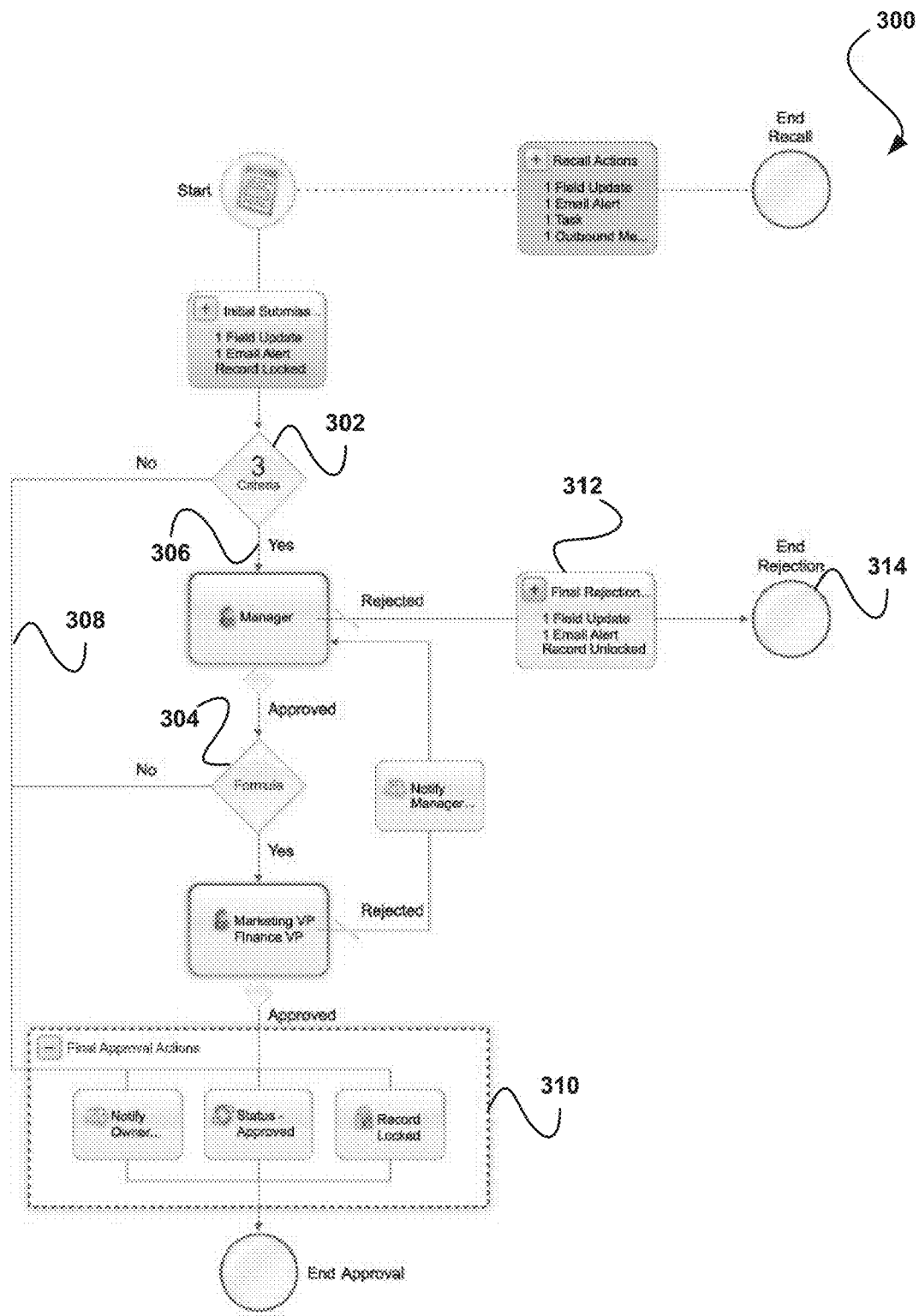
FIG. 3 shows an exemplary process diagram, in accordance with one embodiment.

FIG. 3 shows an exemplary process diagram 300, in accordance with one embodiment. As an option, the process diagram 300 may be implemented in the context of the functionality of FIGS. 1 and/or 2. Of course, the process diagram 300 may be carried out in any desired environment. Further, the aforementioned definitions may apply during the present description.

Criteria Rendering

As shown, the process diagram 300 includes filter criteria 302. The process diagram 300 includes a number of elements found in the filter criteria 302 inside a diamond representing the filter criteria 302. In one embodiment, a number representing the number of elements within the filter criteria 302 may be included within the diamond representing the filter criteria 302. As shown, the text "3 Criteria" within the diamond representing the criteria 302 illustrates that three separate elements are found within the filter criteria 302. In this way, a summary of the elements within the criteria 302 may be shown within the diamond instead of a listing of each element.

In another embodiment, a side bar may show each criteria in its own line appended with an "AND" unless advanced filter options are used, in which case all criteria may appear on one line. One exemplary embodiment of filter criteria is illustrated in Table 1. It should be noted that the embodiment presented in Table 1 is set forth for illustrative purposes only, and thus should not be construed as limiting in any manner.

TABLE 1

(Campaign: Budgeted Cost greater than 10) and (Campaign: Actual Cost greater than 1221) and (Campaign: Campaign Name not equal to null) and (Campaign: Status equals In Progress, Planned)

Additionally, the process diagram 300 includes formula criteria 304. The diamond representing the formula criteria 304 indicates that such criteria are formula criteria by the term "Formula" within the diamond. In one embodiment, the side bar may show the criteria in full, with text wrapped within the width of the side bar. One exemplary embodiment of formula criteria is illustrated in Table 2. It should be noted that the embodiment presented in Table 2 is set forth for illustrative purposes only, and thus should not be construed as limiting in any manner.

TABLE 2

(BudgetedCost >10000 || ActualCost <1000) && NOT(ISNULL(Name))

Header Bar

In one embodiment, the process diagram 300 may include a fixed header bar. For example, the process diagram 300 may include a fixed header bar with an Approval Process name on the left, and a "Help for this Page" link on the right that opens a new Help window.

Line Drawing

In one embodiment, one or more key rules may be established that need to be followed when lines are drawn between elements of the process diagram 300. For example, the process diagram 300 may support lines between 2 steps of the process diagram 300. In one embodiment, when there are no criteria associated with a transition, the line may be a straight arrow connecting the element vertically centered.

Additionally, in another embodiment, the process diagram 300 may support lines between a step in the process diagram 300 and a decision element of a next step in the diagram 300. The line should be vertically centered. In yet another embodiment, a "True"/"Yes" transition out of the decision element in the process diagram 300 may always be connected with a step element vertically centered. For example, the "Yes" transition 306 is vertically centered with respect to the process diagram 300.

Further, in one embodiment, a line from a "False"/"No" transition may go left and down the process diagram 300. For example, the "No" transition 308 is situated to the left of the process diagram 300 and goes down the process diagram 300. In another embodiment, if there are no more steps or there is no SKIP step configured, the "False"/"No" transition may connect to a Final Approval actions element at the bottom of the diagram. For example, in the process diagram 300, the "No" transition 308 has no more steps and no SKIP step configured, and therefore connects to the Final Approval actions section 310.

In another embodiment, if a step in the process diagram 300 is marked "Skippable," and the next step has a criteria associated with it, a line may connect to the left corner of the Decision element of the next step. Further, in still another embodiment, if the step is marked "Skippable," and the next step has NO criteria associated with it, a line may connect to the left corner of the Step element.

Further still, in yet another embodiment, the process diagram 300 may include just one set of Final rejection actions and one End Rejected state element. It may be right of the main flow of the process diagram 300 and may be centered vertically. In another embodiment, the placement may be along a virtual column. For example, in the process diagram 300, the final rejection actions 312 and the end rejection state 314 are located right of the main process flow of the process diagram 300 and are centered vertically.

Also, in still another embodiment, the reject transition may always be oriented horizontally. For example, since a reject transition is possible from every step and the reject actions is common across all steps, only one process reject node and one final rejection action node may exist on the process diagram 300 and multiple lines may exist from nodes to the final rejection action node. Additionally, in one embodiment, the process diagram 300 may support lines for the following reject transitions: "Reject—Go Back to step" and "Reject—'Go Back' node."

In addition, in one embodiment, a line going back to a step in the process diagram 300 may start right and go vertically up and connect to the bottom right edge of a previous step. In another embodiment, rejection lines to the Final rejection action may start horizontally to the right and connect to either the center top edge or center bottom edge of the Final rejection actions element. If the line starts above the Final rejection action box, the vertical line may connect to the top edge. If the line starts below, it may connect to the bottom edge.

Further, in another embodiment, the process diagram 300 may have one final approval actions section at the bottom of the process diagram 300. For example, the process diagram 300 includes a single Final Approval actions section 310 at the bottom of the process diagram 300. Still yet, in another embodiment, when a node has multiple lines transitioning into it, they may be merged into one line.

Further still, step actions may be embedded along transition lines in the process diagram 300. For example, there may never be an arrow before entering a step action. Additionally, when connecting to the Final Rejection actions element, the rejection actions with that step (if any) may be drawn along a imaginary column between the main process flow and the imaginary column associated with the Final Rejection Actions. Further, when connecting to another step, the Step Approval actions Element may be at the center of the transition line between the steps. Further still, when connecting a Decision element, the Step Approval actions Element may be at the center of the transition line between the step and the Decision element.

Actions

In another embodiment, elements indicating "Initial Submission Actions," "Final Rejection Actions" and "Final Approval Actions" may always be labeled, even if they only have 1 action. Further, the process diagram 300 may show the action as-is on a transition line if that is the only action. Further still, if there are multiple actions, then they may be visualized as a sub-process. In another embodiment, a height of the sub-process node depends on how many action types are in it. In one embodiment, the maximum may be to have 5 lines (one line for email alert, task, field update, outbound message, and record lock). In another embodiment, subprocesses may always be labeled, e.g. "Step 2 Approval Actions" or "Step 2 Rejection Actions."

Subprocess—Collapse and Expansion

In one embodiment, lines going into a subprocess may never have an arrow, because actions may be performed on the transition and may not be an end state. In another embodiment, clicking a subprocess may expands it. For example, a "+" button may expand the subprocess and may be the same height as the label.

Additionally, in another embodiment, if there are 2 or more actions in a sub-process, the line going into the sub-process may always be aligned with the 2nd action. In yet another embodiment, the label for the sub-process (e.g. "Final Submission Actions," etc.) may always be made completely visible. Further, when a Recall Subprocess is opened, a line needs to go into the FIRST node so that the minimize button and label can be viewed.

Further still, when the subprocess for initial submission, final approval and step approval actions are expanded, the list of actions may be expanded horizontally. When the subprocess for step rejection and final rejection actions are expanded, the list of actions may be expanded vertically. When the diagrams are expanded and collapsed, the shapes may not overlap. The most recently opened subprocess may be on top.

Approvers

In one embodiment, approver nodes may be labeled with "Step X" in the top left-hand corner and may have the step name inside the node. In another embodiment, the sidebar may be titled with "Step X: Step Name," e.g. (Step 1: VP of Finance, VP of Tech). Additionally, one exemplary embodiment of additional text that may be shown in the sidebar is illustrated in Table 3. It should be noted that the embodiment presented in Table 3 is set forth for illustrative purposes only, and thus should not be construed as limiting in any manner.

TABLE 3

-Submitter can choose approver
-Automatically assigned to Manager field
-Unanimous approval required from: <br/> <APPROVER 1>, <APPROVER 2>, <APPROVER N>
-Approval based on FIRST response from: <br/> <APPROVER 1>, <APPROVER 2>, <APPROVER N>, Related User: Campaign Owner
-The approver's delegate may also approve this request. (this may be in its own block if true)

Aligning

In one embodiment, as the flow of control across multiple steps is displayed vertically, the primary flow may be center aligned. Additionally, the final rejection actions and the End Rejection with the transitions between them may be center horizontally aligned.

Labels

In one embodiment, static labels such as Start, End Recall, End Rejection, End Approval, Approved, Rejected, Yes, No may be rendered appropriately. In another embodiment, Labels should be dynamically rendered appropriately for the following shapes: Decisions, Human activity, Actions, and Subprocesses. Further, the Label for the Sub process diagram element associated with a step approval may be "<Step Name> Approval Actions" and "<Step Name> Rejection Actions" for step rejection Sub Process diagram element. Also, all labels may be appended with " . . . " if they do not fit into a node or box.

Scrolling

In one embodiment, the process diagram 300 may have a fixed width without any expanded sub process along the horizontal axis. Additionally, the process diagram 300 may have a fixed width with an expanded sub process along the horizontal axis. Further, if the process diagram 300 exceeds the right boundary of the window than there should be a horizontal scrollbar. Further still, the process diagram 300 may have a variable size along the vertical axis.

Legend

In one embodiment, the process diagram 300 may include a legend. For example, a legend may be displayed on the process diagram 300 (e.g., a side, top, bottom, etc.) that includes all shapes used in the process diagram 300.

Sidebar

In one embodiment, a sidebar may be included in the process diagram 300. For example, the sidebar may appear when a user selects or hovers over an element in the process diagram 300. In another embodiment, the sidebar may consist of two or more panels. A top panel may have a checkbox to turn off a legend and Approval Process Properties, which may be collapsible. A bottom panel may show details of a node of the process diagram 300 when you hover over the node. In another embodiment, default text in the bottom panel may say "Hover over an item to see its details." In yet another embodiment, details may stay in the sidebar until you hover over something else in the process diagram 300. Also, highlighted nodes may also stay highlighted until you hover over something else.

In another embodiment, the sidebar may include one or more options associated with field updates, email alerts, tasks, and outbound messages. For example, one exemplary embodiment of options that may be available in the sidebar is illustrated in Table 4. It should be noted that the embodiment presented in Table 4 is set forth for illustrative purposes only, and thus should not be construed as limiting in any manner.

TABLE 4

FIELD UPDATES
Update <FIELD NAME> with lookup value: <LOOKUP VALUE>
Update <FIELD NAME> with value: <VALUE>
Update <FIELD NAME> with formula: <FORMULA>
EMAIL ALERTS
Send <EMAIL TEMPLATE> email to <RECIPIENT 1>, <RECIPIENT 2>, <RECIPIENT N>
TASKS
Assign task to <ASSIGNEE> with due date: <DUE DATE>
OUTBOUND MESSASGES
Send the fields <FIELD 1>, <FIELD 2>, <FIELD N> to endpoint: <ENDPOINT>

Exception Diagrams

Figure 4:
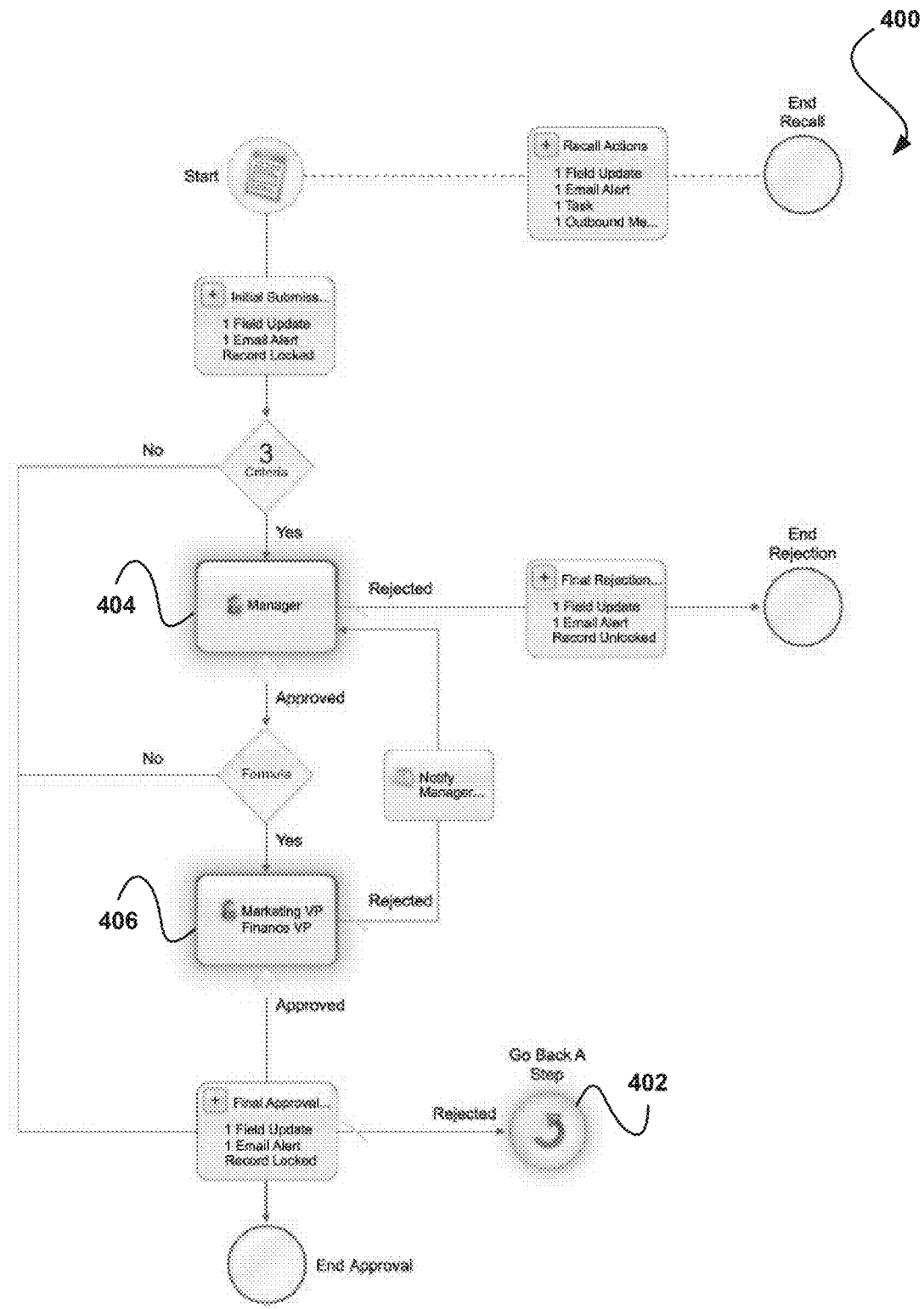
FIG. 4 shows an exemplary exception diagram, in accordance with one embodiment
Figure 5A:
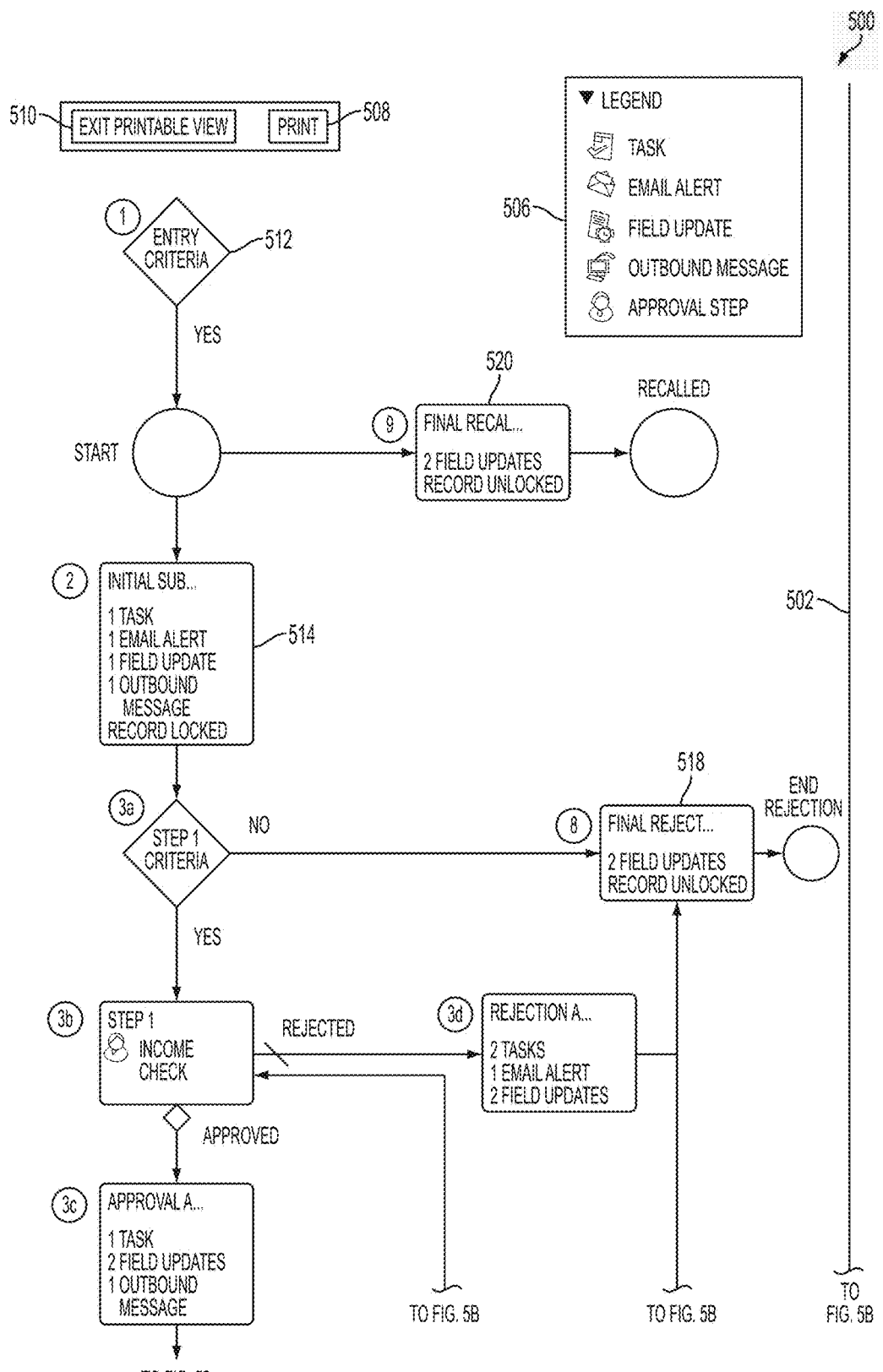
Figure 5B:
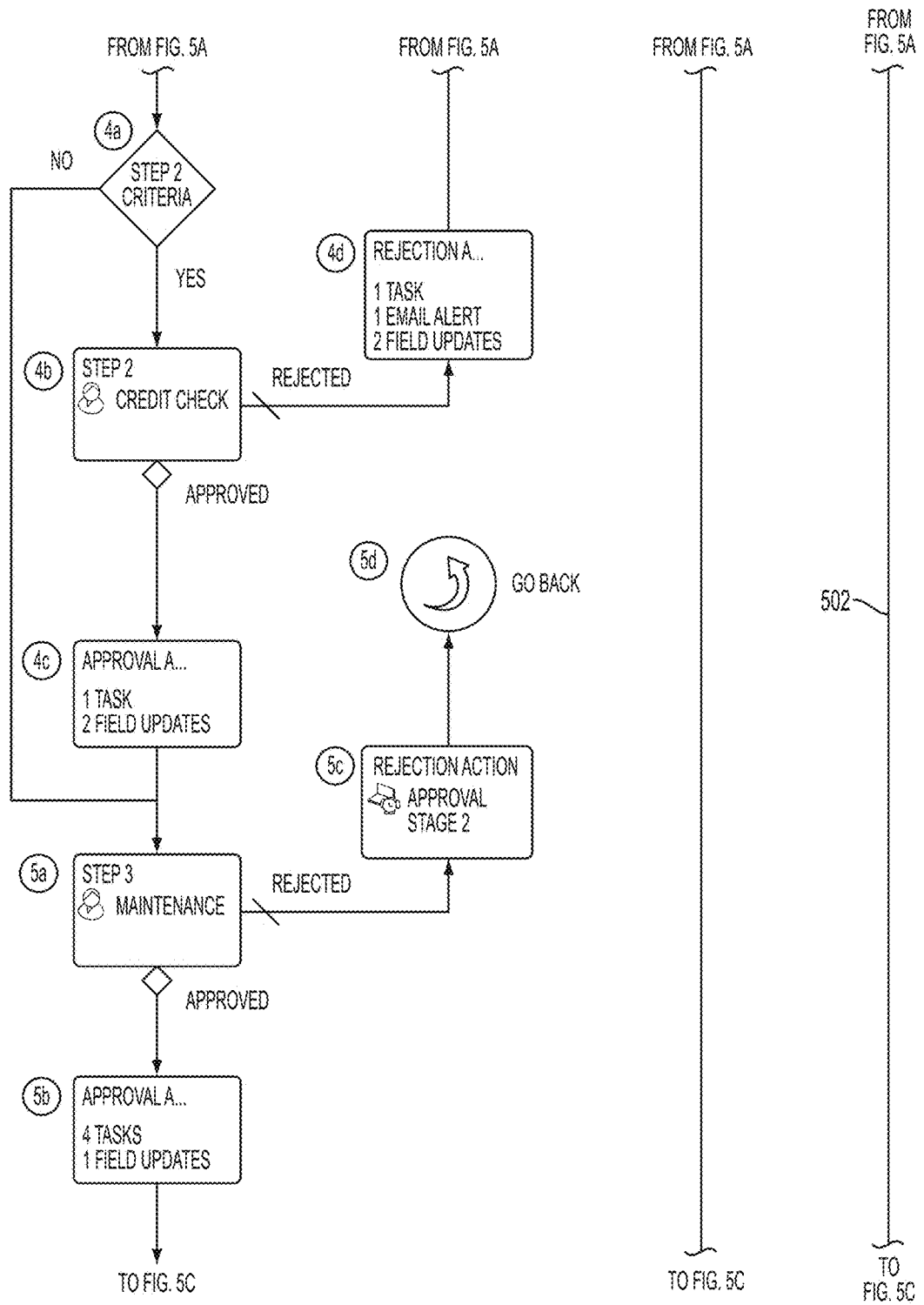
Figure 5C:
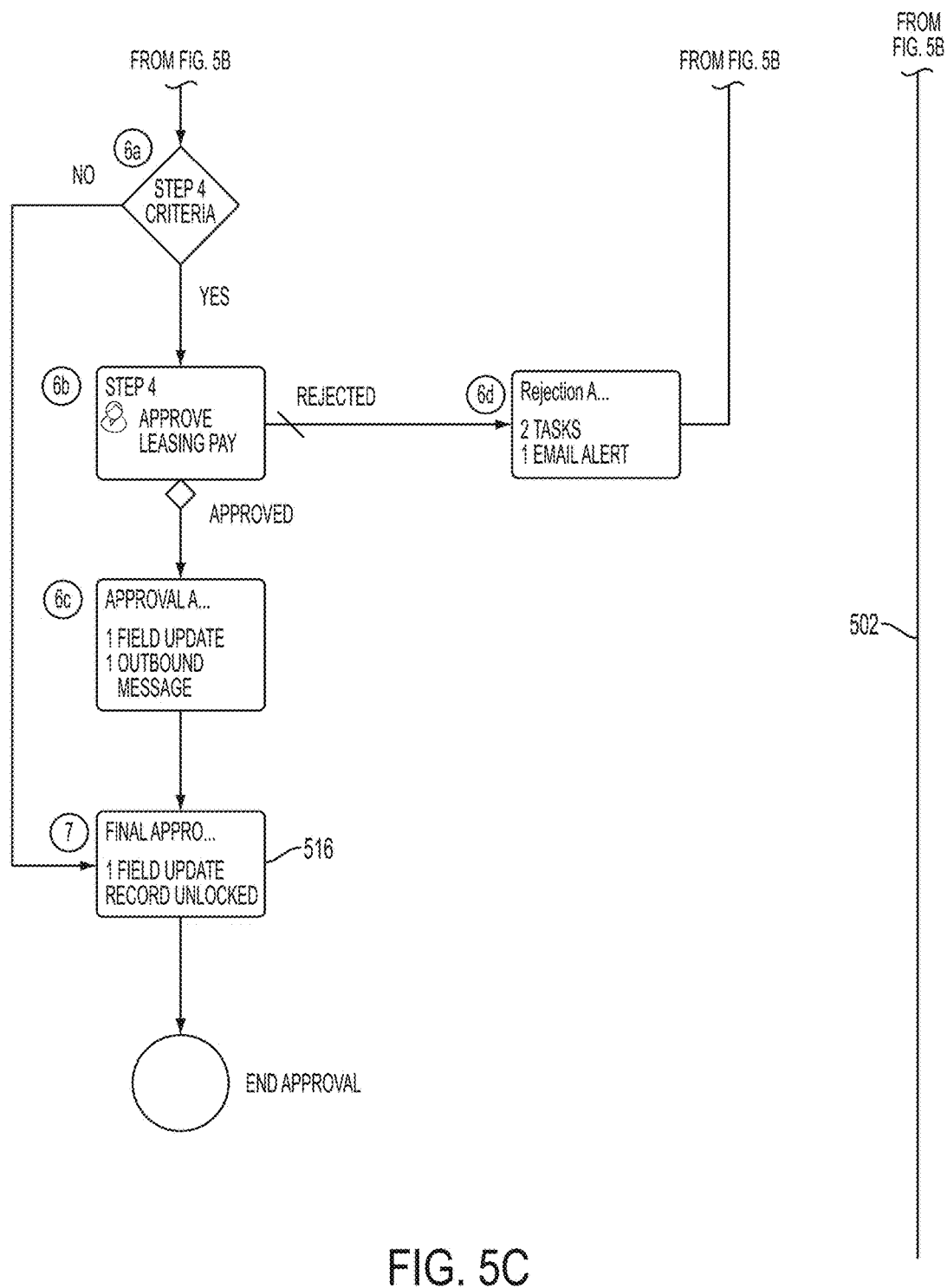
Figure 5E:
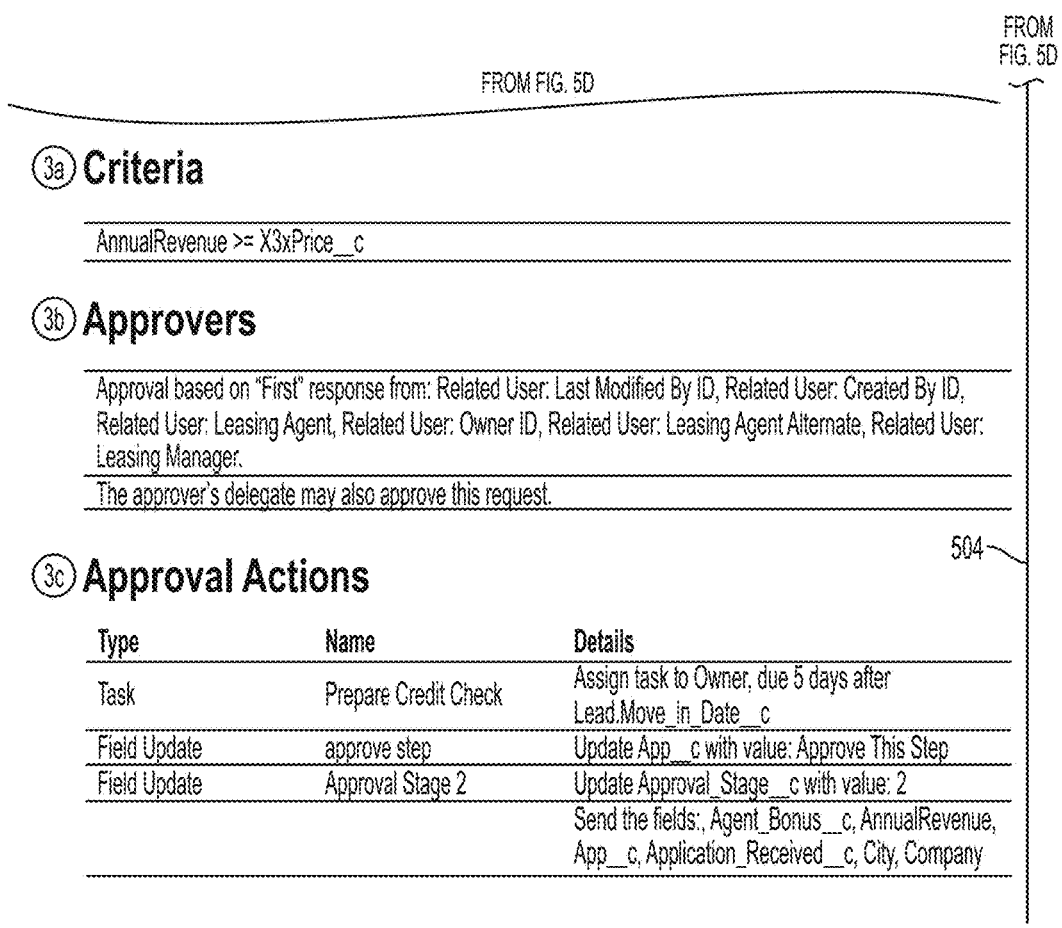

FIG. 4 shows an exemplary exception diagram 400, in accordance with one embodiment. As an option, the exception diagram 400 may be implemented in the context of the functionality of FIGS. 1-3. Of course, however, the exception diagram 400 may be carried out in any desired environment. Further, the aforementioned definitions may apply during the present description.

In one embodiment, an engine running a process diagram may provide certain features where the visual representation is not feasible because the flow is determined only at run-time. For example, when an approve element of the process diagram rejects a request, the current editor may support the ability to "Go Back" to the previous step. For example, the "Go Back A Step" option 402 in exception diagram 400 supports the ability to go back to a previous step in the exception diagram 400.

Additionally, the skip feature may make the previous step non-deterministic at design-time. So, if such a condition is detected, a special node called "Go Back" may be shown to the user. For example, by hovering over the "Go Back" icon it may highlight all possible steps that it can go back to. Additionally, a verbal explanation may also be provided in the sidebar. For example, by hovering over the "Go Back A Step" option 402 in exception diagram 400, all possible steps 404 and 406 that can be gone back to are highlighted. In this way, all possibilities to go back in the process diagram may be dynamically shown if more than one possibility exists.

Additionally, the engine may have a safe guard against approving records which enter the process, but do not send an approval request because of the skip feature. For example, if such a condition is detected, a special note at the bottom of the process acting as a "disclaimer" may be shown to the user.

Printing

FIG. 5A-FIG. 5E shows an exemplary printable view 500, in accordance with one embodiment. As an option, the printable view 500 may be implemented in the context of the functionality of FIGS. 1-4. Of course, however, the printable view 500 may be carried out in any desired environment. Further, the aforementioned definitions may apply during the present description.

In one embodiment, a user may select to view a process diagram as the printable view 500. For example, a user may click 'Printable View' while viewing the process diagram, and the window may reload with the printable view 500. The main content area switches to a non-interactive annotated diagram 502 followed by a table 504 that contains all relevant information. In this way, a user may switch from a view mode to a print mode to print the process diagram.

In one embodiment, gradient may be removed from nodes, which may be given a white background. Additionally, a legend 506 is displayed on the printable view 500. In one embodiment, the legend 506 may be displayed on first page of the printable view 500 only. Further, in one embodiment, all subprocesses may be collapsed and all "+" buttons may be removed on the printable view 500.

Also, in one embodiment, a button bar at the bottom or top of the process diagram may stay in place but the buttons may change. For example, a 'Print' button 508 appears on the printable view 500 that may open a Print dialogue when selected. Additionally, a 'Printable View' button changes to an 'Exit Printable View' button 510, which may toggle back to a standard view when selected. Further, in one embodiment, page breaks may be illustrated in the printable view 500.

Further still, in one embodiment, all pages in the printable view 500 may have a header with the title of the approval process and last modified info (e.g., "Last Modified by David Park on Apr. 23, 2009 3:01 PM," etc.). Also, in another embodiment, a width of the printable view 500 may be fixed and fit on the page, since the height may be variable the diagram may run across multiple pages. Additionally, if the process diagram spans multiple pages in the printable view 500, a node may never be split across 2 pages. For example, the bottom of page 1 of the printable view 500 may be an outgoing line and the top of page 2 of the printable view 500 may be an incoming line, etc.

Furthermore, in one embodiment, the table of data 504 may be on its own page. For example, the diagram and part of the table may never be on one page. In addition, a table for the Approval Properties may be provided, as well as a table for the Annotations. In one embodiment, the Annotations table may reflect the hover details in the sidebar. In another embodiment, Flex's standard table component may be used for accessibility purposes.

As also shown, the ordering of the annotated numbers reflects the ordering in the annotated diagram 502. For example, Entry Criteria 512 is ordered first (e.g., as #1); Initial Submission Actions 514 is ordered second (e.g., as #2). In one embodiment, if Entry Criteria 512 is absent in the annotated diagram 502; Initial Submission Actions 514 is ordered first. Additionally, any Approval Steps are numbered. For example, Step 1 Criteria may be numbered #2a, Approval Step may be numbered #2b, Approval Actions may be numbered #2c, Rejection Actions may be numbered #2d, Go Back may be numbered #2e. In another embodiment, all nodes associated with 1 step may have the same number but may be sub-annotated with letters.

Further, Final Approval Actions 516 are then numbered, then Final Rejection Actions 518, and then Final Recall Actions 520. In one embodiment, the annotated number may be circled and may go to the top left of all nodes (e.g., criteria, step approver, rejection action, approval action, key actions, go back nodes, etc.). In another embodiment, the Start, End Recall, End Reject, End Approval nodes may not be annotated. As such, all elements of the process diagram may be numbered, and footnotes in the table 504 may explain all such elements and all their steps in comprehensive detail using text.

In this way, the process diagram may be transferred into a pure documentation aspect to be used as a document that may be physically examined. For example, the process diagram may be saved as any sort of document (e.g. portable document format (PDF), etc.). Additionally, a full summary of the process diagram may be created.

Large Process Navigation

Figure 6:
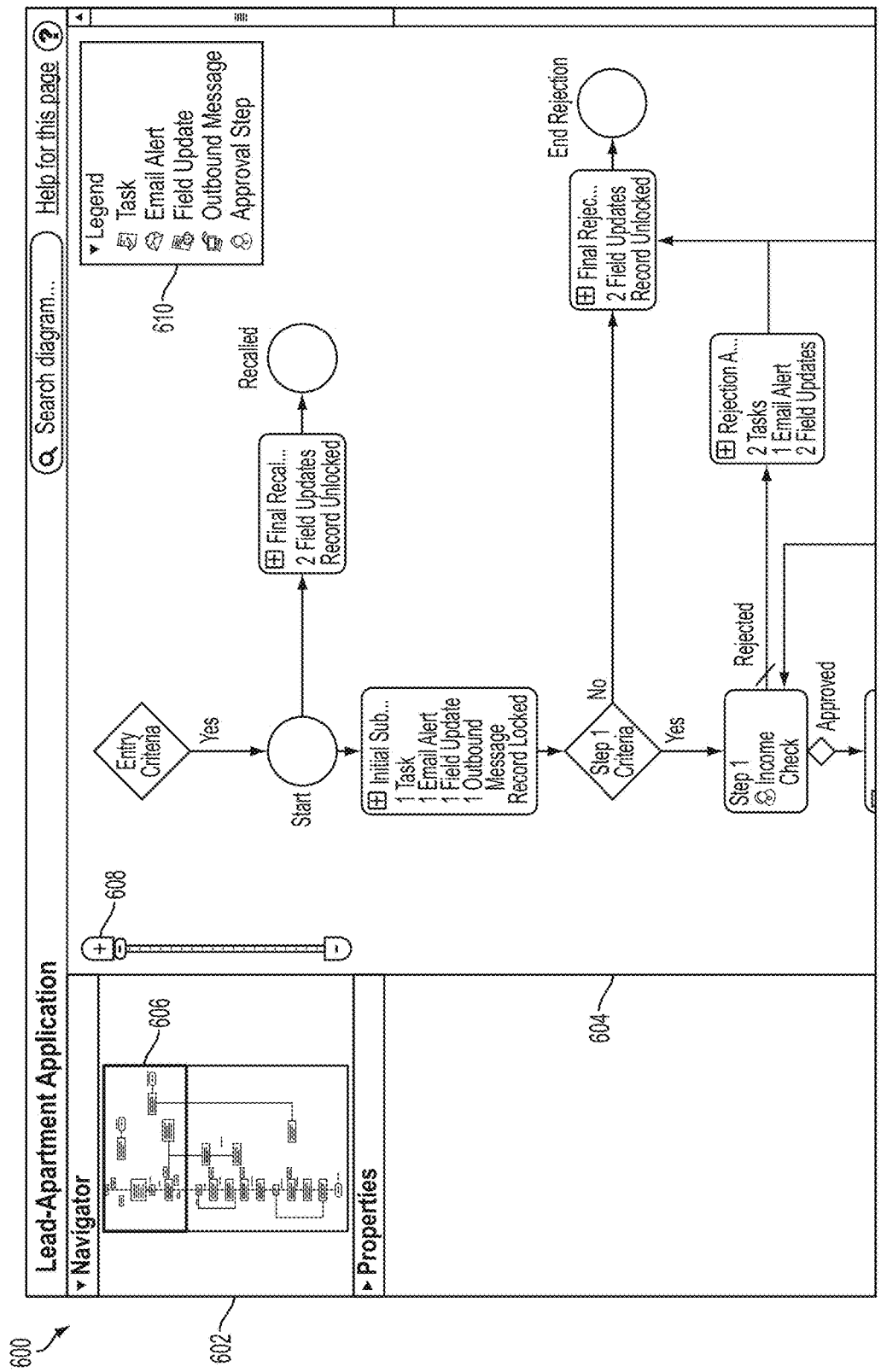
FIG. 6 shows an interface including a large process view, in accordance with one embodiment.

FIG. 6 shows an interface including a large process view 600, in accordance with one embodiment. As an option, the interface 600 may be implemented in the context of the functionality of FIGS. 1-5. Of course, however, the interface 600 may be carried out in any desired environment. Further, the aforementioned definitions may apply during the present description.

As shown, the interface 600 includes a navigator component 602. In one embodiment, the navigator component 602 may be a collapsible panel in the sidebar. In another embodiment, the navigator component 602 may have a fixed height. This may prevent the navigator component 602 from taking up the whole sidebar.

Additionally, the entire process is visible in the navigator component 602. Further, the visible portion of the main diagram 604 is represented in the navigator component 602 as a rectangular frame 606. In one embodiment, the frame 606 may be dragged up and down by a user to see different parts of the diagram. In another embodiment, the diagram in the navigator component 602 and the main diagram 604 may be 1:1. For example, if a sub-process is opened in the main diagram 604 the same sub-process may be opened in the navigator component 602 as well.

In this way, complex and/or large processes may be able to be comprehensively navigated. Additionally, the navigator component 602 may provide a small snapshot of an overall process, and may provide a view of the entire process within the current window. Further, the entire process may be viewed without zooming out, which may enable a user to navigate the process quickly. Further still, if a user is at or near the top of a large process, they may quickly and simply navigate to the bottom of the process using the navigator component 602.

Zoom Component

Additionally, a zoom slider 608 is also located in the interface 600. For example, the zoom slider 608 may be located in the top left of the main diagram 604. Further, in one embodiment, the zoom slider 608 may be defaulted to 100% zoomed in. In another embodiment, adjusting the zoom slider 608 to 0% zoom may be equivalent to seeing the entire diagram in the default window size. Further still, in one embodiment, adjusting the zoom slider 608 may be equivalent to adjusting the size of the frame 606 in the navigator component 602.

In another embodiment, the navigator component 602 may adjust to the location of the user. For example, the frame 606 of the navigator component 602 may move according to user movements in the main diagram 604. Additionally, the navigator component 602 may consider borders, and may maintain a focus on a center of the diagram to scale when zooming in and out.

In addition, the interface 600 may include a legend 610. In yet another embodiment, zooming may not affect the legend 610. For example, the legend 610 may always stay the same size. In another embodiment, a user may use keyboard shortcuts to zoom in the interface 600.

Search

Figure 7:
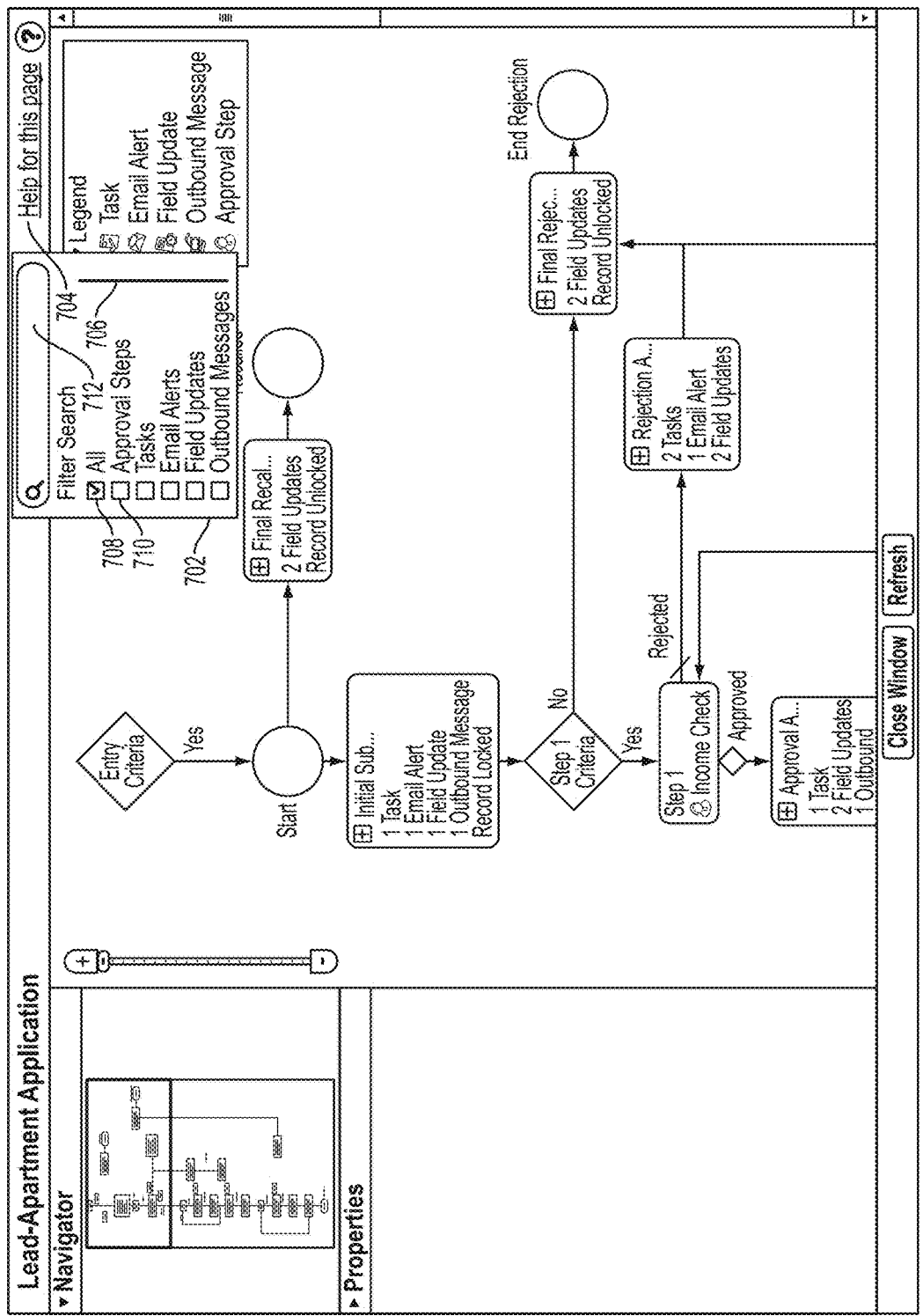
FIG. 7 shows an exemplary searchable process diagram interface, in accordance with one embodiment.

FIG. 7 shows an exemplary searchable process diagram interface 700, in accordance with one embodiment. As an option, the searchable process diagram interface 700 may be implemented in the context of the functionality of FIGS. 1-6. Of course, however, the searchable process diagram interface 700 may be carried out in any desired environment. Further, the aforementioned definitions may apply during the present description.

As shown, the searchable process diagram interface 700 includes a search component 702. In one embodiment, the search component 702 may exist in the header to the left of a Help link 704. Of course, however, the search component 702 may exist anywhere within the searchable process diagram 700. Additionally, when the search component 702 is in focus a menu 706 appears. In one embodiment, the menu 706 may enable a user to filter their search. In one embodiment, if a user chooses any of the other options in the menu 706 besides the "All" option 708 than the "All" checkbox 708 may automatically uncheck. Additionally, if a user checks the "All" checkbox 708 then all the other options in the menu 706 may be unchecked.

Further, if a user checks the "Approval Steps" option 710 then the diagram interface 700 may gray out except for the steps. Additionally, once a user starts typing in the search bar 712, nodes in the diagram interface 700 that do not match the search term would continue to gray out. Further, in one embodiment, when the term in the search bar 712 loses focus, the menu 706 may disappear. In still another embodiment, when a user starts typing text in the search bar 712, all elements within the diagram interface 700 that contain the text may be highlighted.

Figure 8:
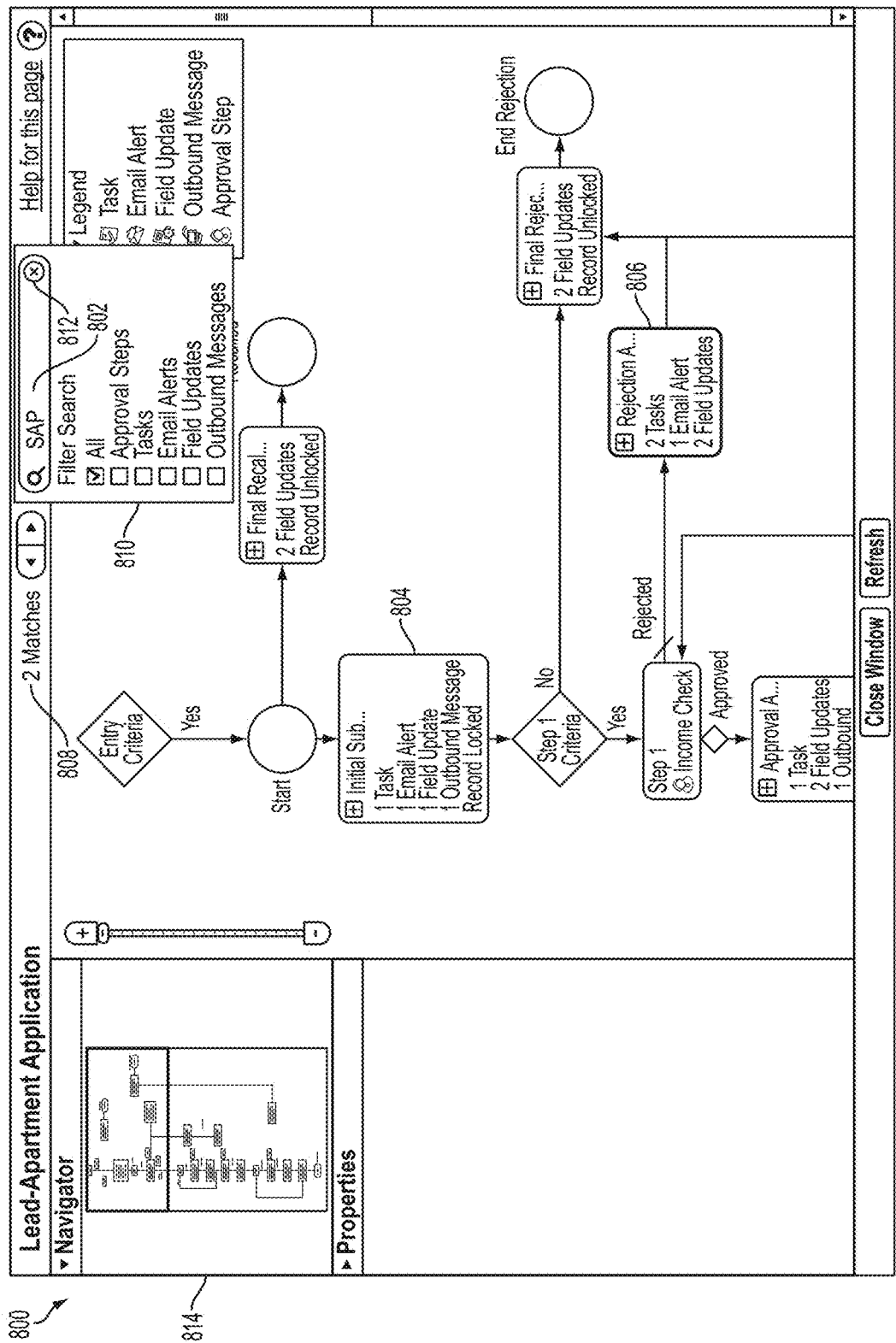
FIG. 8 shows another exemplary searchable process diagram interface, in accordance with one embodiment.

FIG. 8 shows another exemplary searchable process diagram interface 800, in accordance with one embodiment. As an option, the searchable process diagram interface 800 may be implemented in the context of the functionality of FIGS. 1-7. Of course, however, the searchable process diagram interface 800 may be carried out in any desired environment. Further, the aforementioned definitions may apply during the present description.

As shown, when a user starts typing in the search bar 802, a mask appears over the diagram interface 800, and nodes 804, 806 that include the search term are highlighted. For example, the mask may be colored grey, whereas the nodes that include the search term may be highlighted in white. In one embodiment, only the nodes that include the search term (here, highlighted nodes 804 and 806) may be interactive. For example, hovering over a masked node may not do anything. In another embodiment, the mask may appear as soon as the first character of the search term is entered, and as progressive characters of the search term are entered, the mask may grow larger as it covers nodes that do not meet those newly entered characters.

Also, a number of matches 808 may be displayed in the diagram interface 800. For example, the number of matches 808 may be displayed to the left of the search box 810. In another embodiment, if there are no matches, the area where the number of matches 808 is displayed may read "Not found." In yet another embodiment, clearing the search box 802 (e.g., by manually deleting the search term, or clicking the X button 812) may exit search mode.

In another embodiment, the navigator window 814 may also be masked, with highlighted nodes that include the search term. In this way, a user may quickly identify and go to search matches within the navigator window 814.

Figure 9:
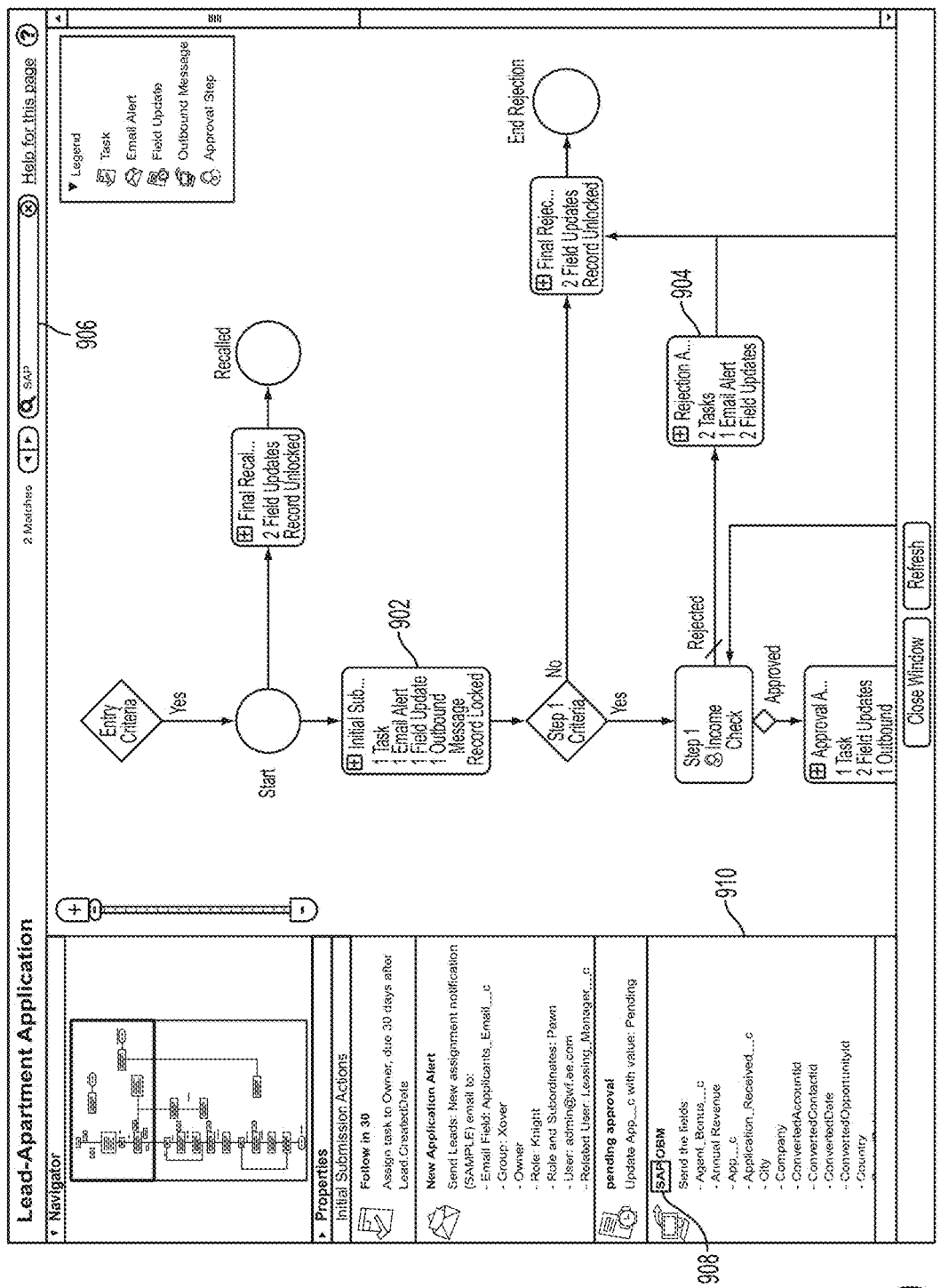
FIG. 9 shows yet another exemplary searchable process diagram interface, in accordance with one embodiment.

FIG. 9 shows yet another exemplary searchable process diagram interface 900, in accordance with one embodiment. As an option, the searchable process diagram interface 900 may be implemented in the context of the functionality of FIGS. 1-8. Of course, however, the searchable process diagram interface 900 may be carried out in any desired environment. Further, the aforementioned definitions may apply during the present description. As shown, when a user hovers over a highlighted node 902 or 904, the sidebar 910 appears, and the term searched for in the search bar 906 is highlighted 908 in the sidebar 910. In this way, when performing a search, matching sidebar terms are highlighted during hovering over a node.

Figure 10:
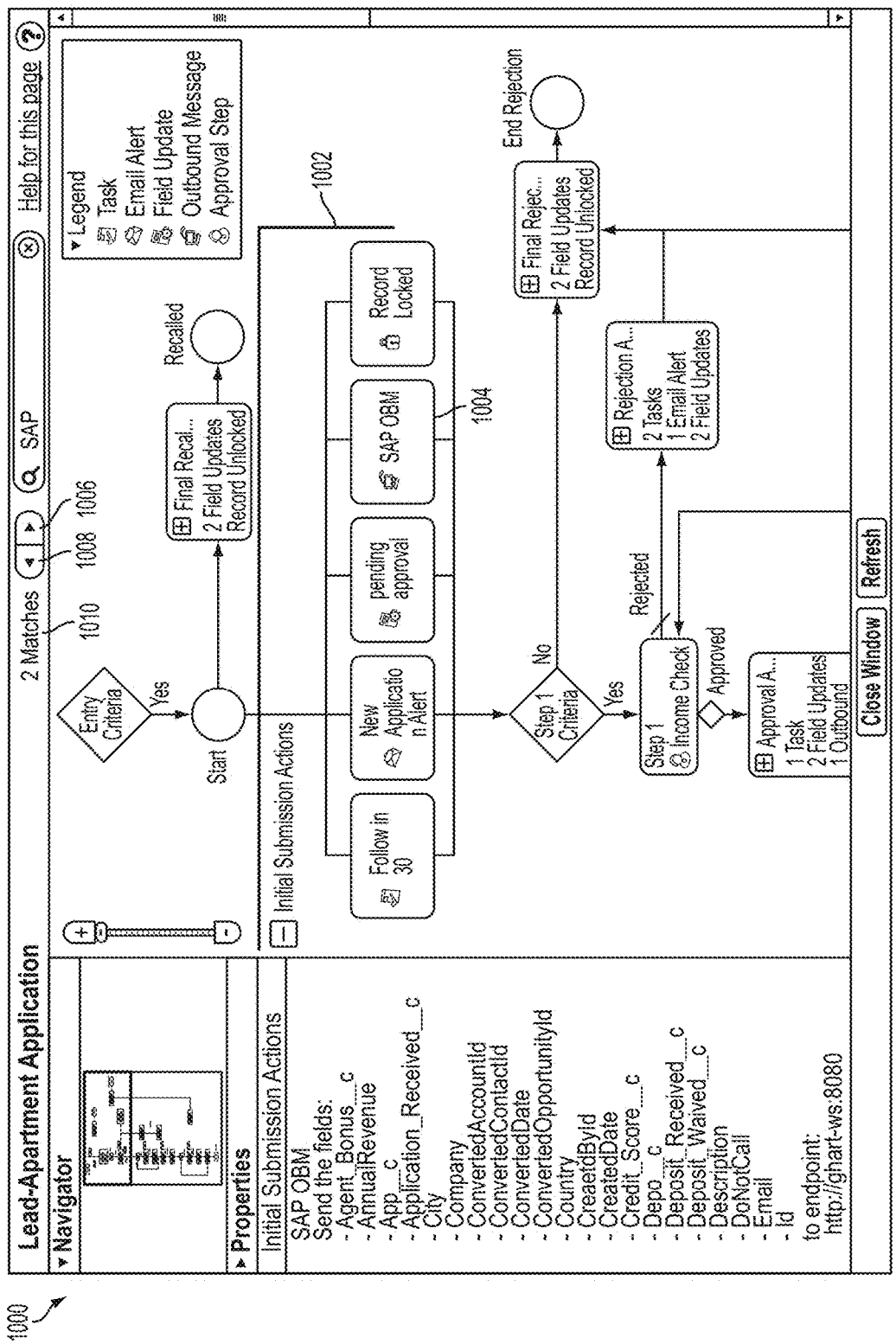
FIG. 10 shows still another exemplary searchable process diagram interface, in accordance with one embodiment.

FIG. 10 shows still another exemplary searchable process diagram interface 1000, in accordance with one embodiment. As an option, the searchable process diagram interface 1000 may be implemented in the context of the functionality of FIGS. 1-9. Of course, however, the searchable process diagram interface 1000 may be carried out in any desired environment. Further, the aforementioned definitions may apply during the present description. As shown, when a user opens a subprocess 1002, only the child node 1004 that contains the search term will be highlighted.

Additionally, diagram interface 1000 includes a Next button 1006 and a Previous button 1008. In one embodiment, these buttons may appear next to the search bar. Of course, however, these buttons may be located anywhere on the diagram interface 1000. In one embodiment, the next node containing a search result after a currently selected node may be selected by the Next button 1006. For example, clicking the Next button 1006 may be equivalent to hovering over a next node that contains a search result. If the node is a child node (e.g., child node 1004, etc.) in a subprocess, the subprocess may automatically be opened and the child node may be highlighted. Additionally, in one embodiment, if the next node is outside of the subprocess, the subprocess may automatically close.

Further, in another embodiment, if the next node is not visible in the window, than the window may automatically scroll so that the next node is visible. In yet another embodiment, if the user hovers over a node before clicking the "Next" button 1006, once they click the "Next" button 1006 the node after the one that the user hovered on may be highlighted. For example, if a process is a four step process, and a user checks "Approval Steps" in a search component, then the match area 1010 may say "4 Matches," and a user may go through each of the four steps by using the Next button 1006 and the Previous button 1008 as well.

Window Size

In one embodiment, the process diagram may have a default window size. For example, the process diagram may have a default window width of 840 pixels and a default height of 450 pixels.

Zoom Controls

In one embodiment, "Zoom-In" and "Zoom-Out" buttons may be provided in the process diagram (e.g., in the footer of the process diagram, etc.). Additionally, in one embodiment, when a user zooms out, text may get smaller and there may be a limit to how far the user can zoom out. Further, when a user zooms in past a default state, the text may stay the same size and any ellipses may gradually drop out as the node becomes larger.

In this way, the process diagram may be centered as much as possible after zooming in or out. Additionally, after zooming in, the process diagram may be centered when a user subsequently zooms back out. In this way, the process diagram may be centrally structured, centrally aligned, etc.

Alternate Layouts

In one embodiment, the sidebar of the process diagram may include multiple panels. For example, the sidebar may include a Process Properties panel, a Workflow Actions panel, an Inspector panel, etc. In another embodiment, the option to hover over one or more elements of the process diagram may be removed. Additionally, in another embodiment, a user may select an action or a node of the process diagram by clicking on one or the other. For example, selecting an action may deselect a node, selecting a node may deselect an action, etc.

Further, in one embodiment, when a user selects an action of the process diagram, action details may be displayed in the Inspector panel. Additionally, nodes in the process diagram where the action exists may be outlined. Further, for opened subprocesses, only the child node may be outlined (e.g., the parent node may not be outlined). In another embodiment, when the user selects a node, node details may be shown in the Inspector panel. Additionally, the node may have a selection style (which may override a dirty style if the node is dirty). Further, if the selected node is a step, an edit button may be shown, and if the node is an action, a remove button may be shown.

Figure 11:
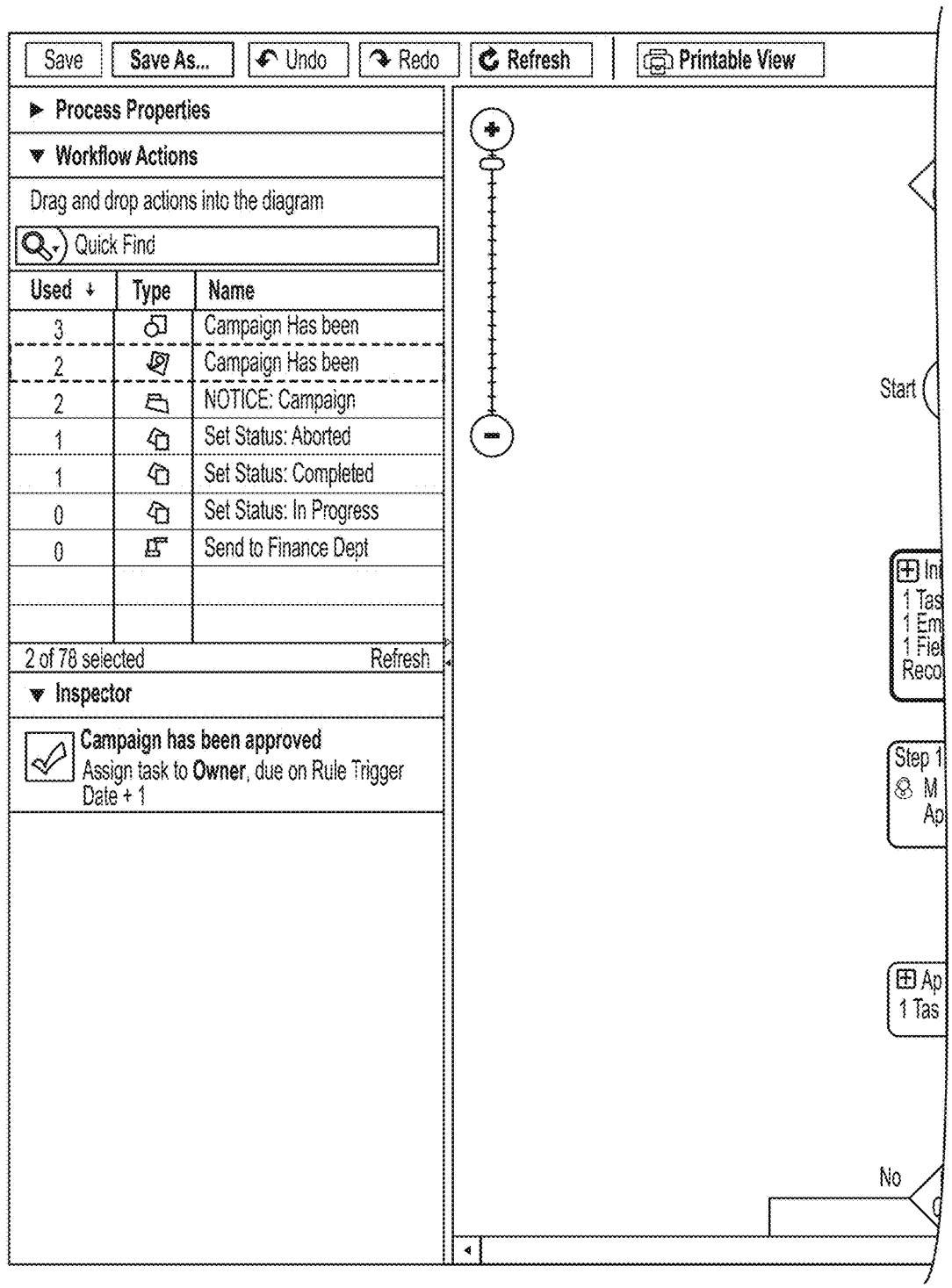
FIG. 11 shows an exemplary action being selected in a sidebar of a process diagram interface, in accordance with one embodiment.
Figure 12:
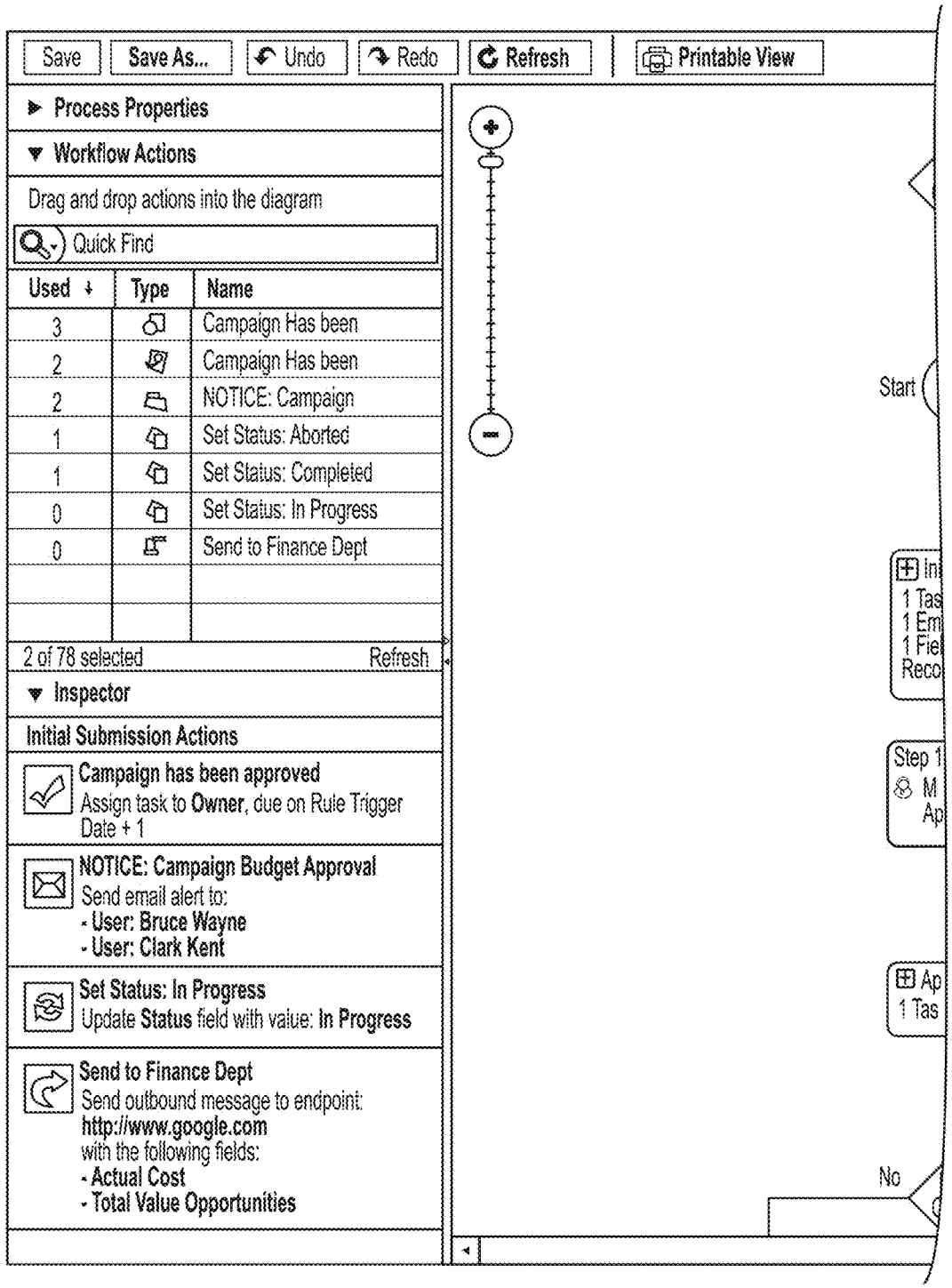
FIG. 12 shows an exemplary subprocess being selected in a sidebar of a process diagram interface, in accordance with one embodiment.
Figure 13:
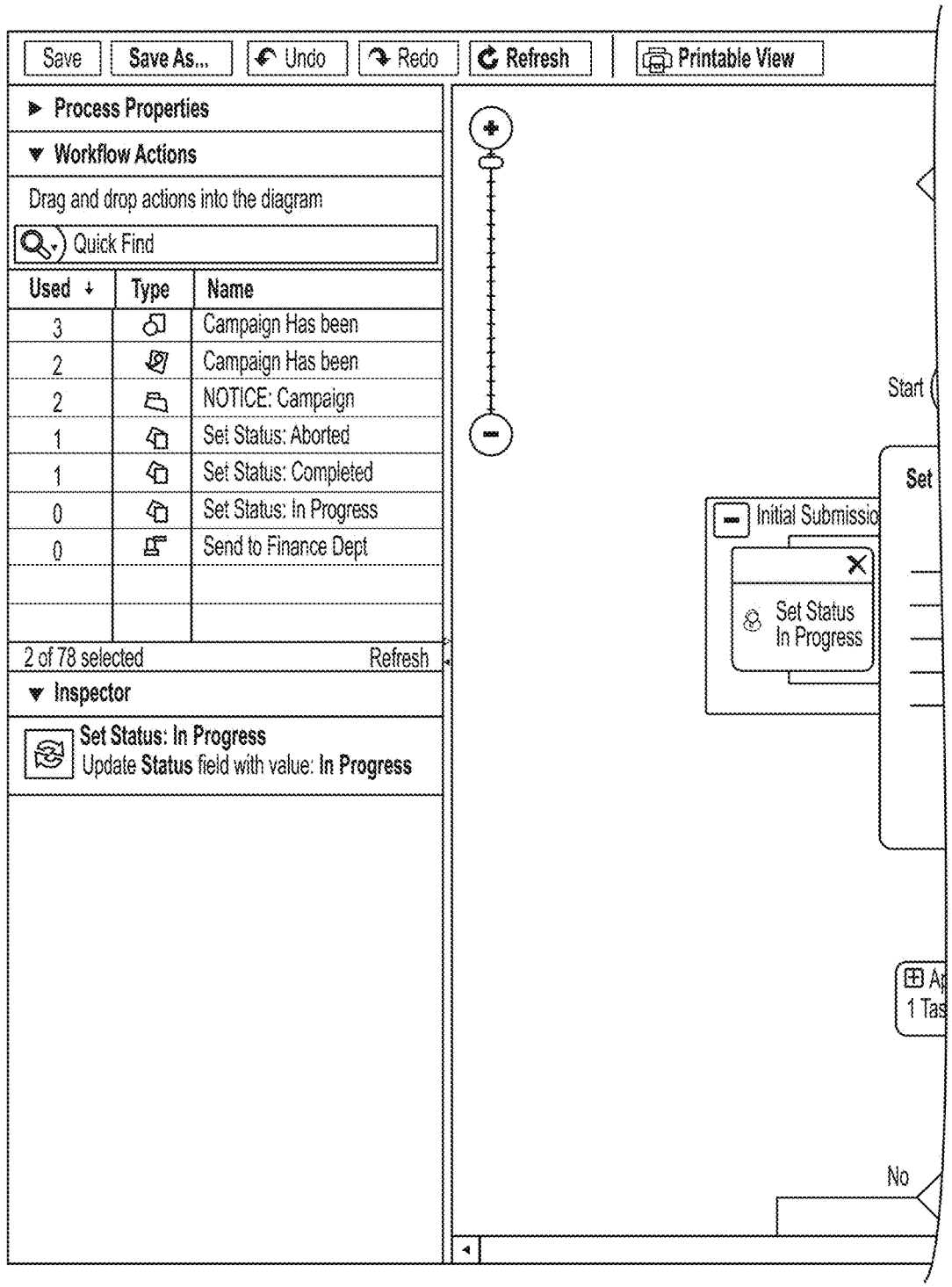
FIG. 13 shows an exemplary action being double-clicked in a sidebar or a diagram in a process diagram interface, in accordance with one embodiment.
Figure 14A:
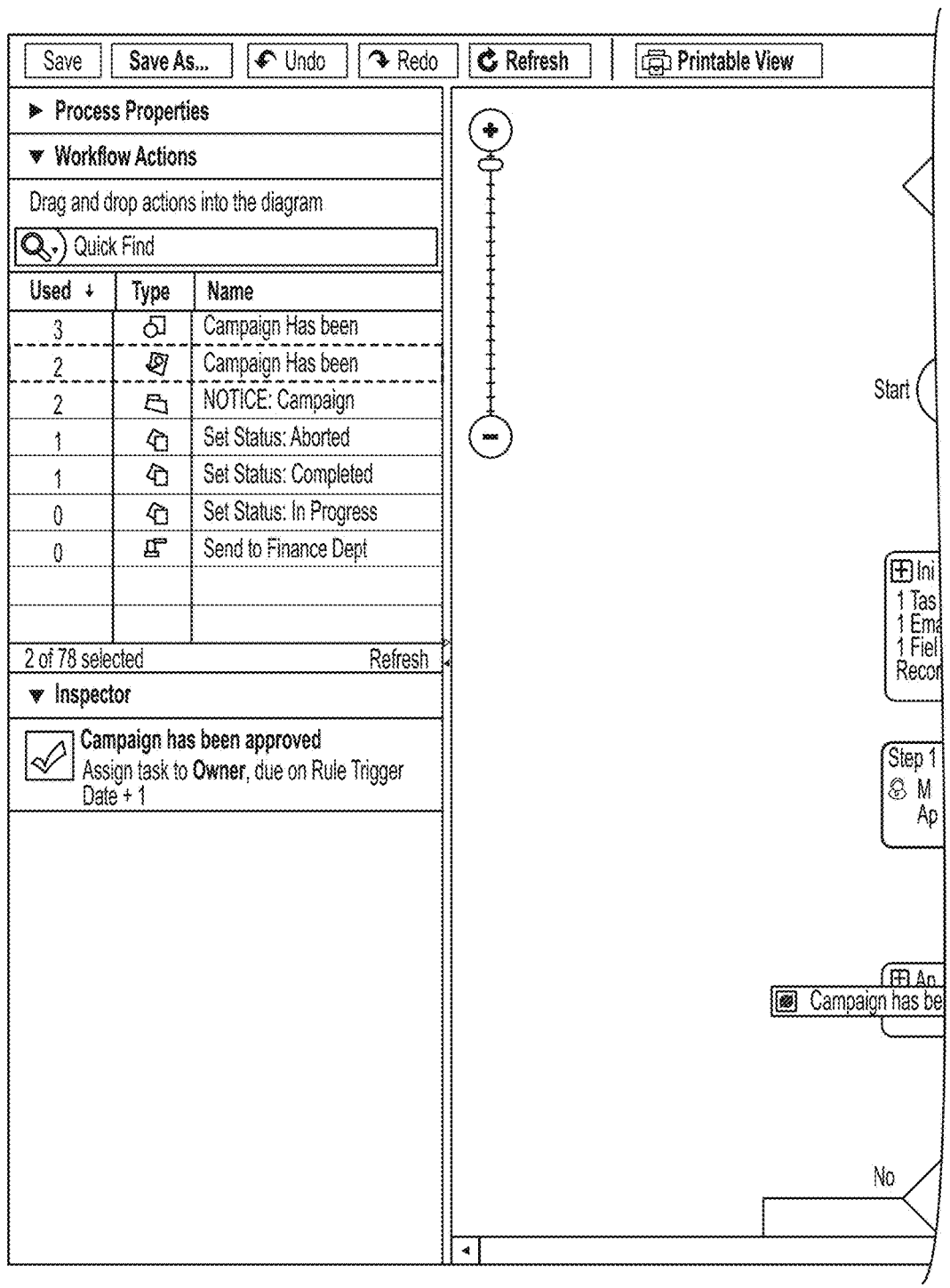
FIG. 14A shows an exemplary drag and drop action in a process diagram interface, in accordance with one embodiment.
Figure 14B:
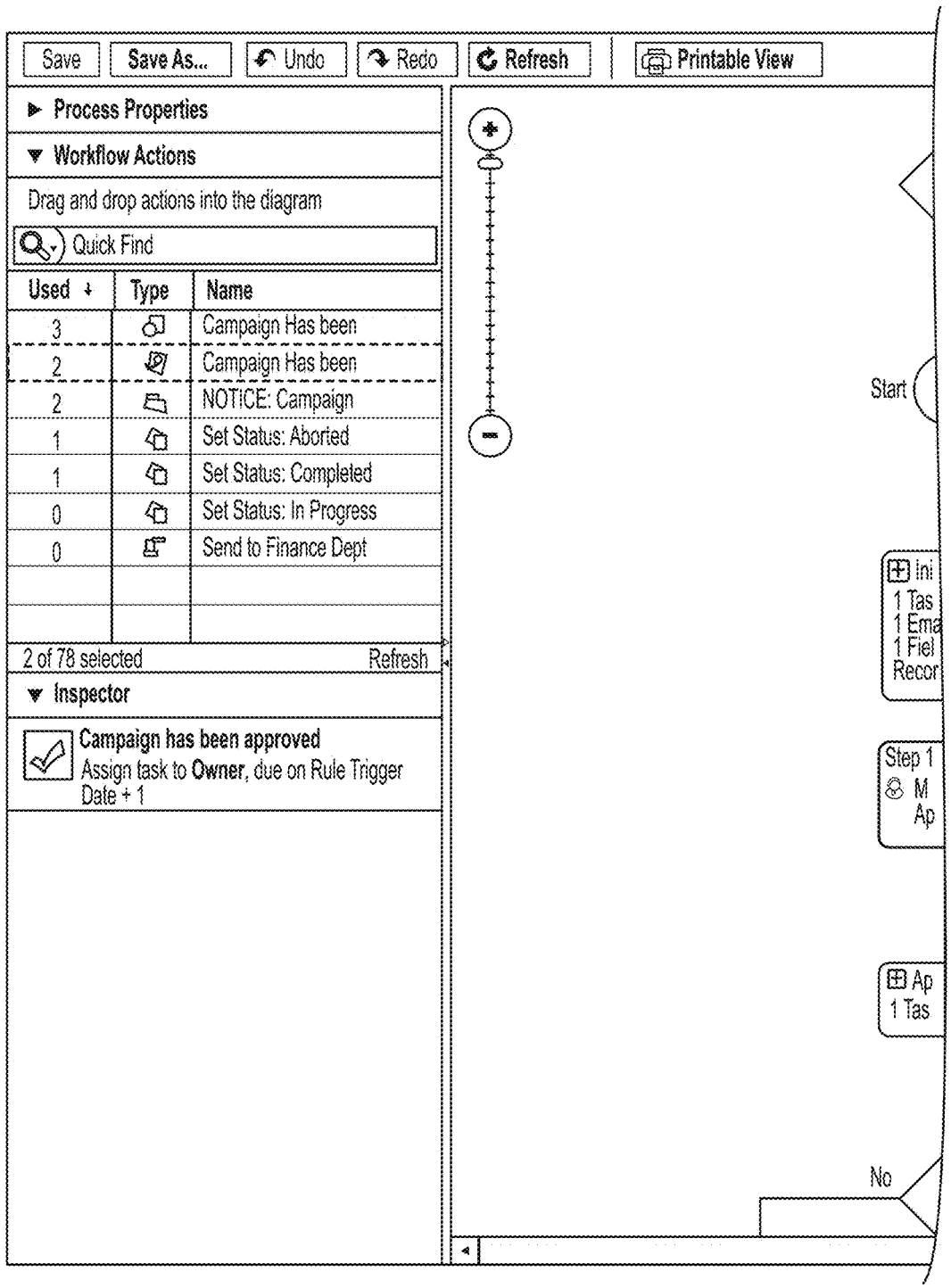
FIG. 14B shows another exemplary drag and drop action in a process diagram interface, in accordance with one embodiment.

Also, in another embodiment, upon performing a drag and drop, a selected action may remain selected, and its details may remain in the Inspector panel. Upon performing a drop, the selected node may be come dirty and may be outlined. In yet another embodiment, an Action list may exist in the sidebar or elsewhere in the process diagram, and if a user double clicks on an action in an Action list, an overlay may be shown with one or more details of the action. In another embodiment, this overlay may be editable. One exemplary action being selected in a sidebar of a process diagram interface is shown in FIG. 11, in accordance with one embodiment. Additionally, an exemplary subprocess being selected in a sidebar of a process diagram interface is shown in FIG. 12, in accordance with one embodiment. Further, an exemplary action being double-clicked in a sidebar or a diagram in a process diagram interface is shown in FIG. 13, in accordance with one embodiment. Further still, an exemplary drag and drop action in a process diagram interface is shown in FIGS. 14A and 14B, in accordance with one embodiment.

Find Functionality

Figure 15:
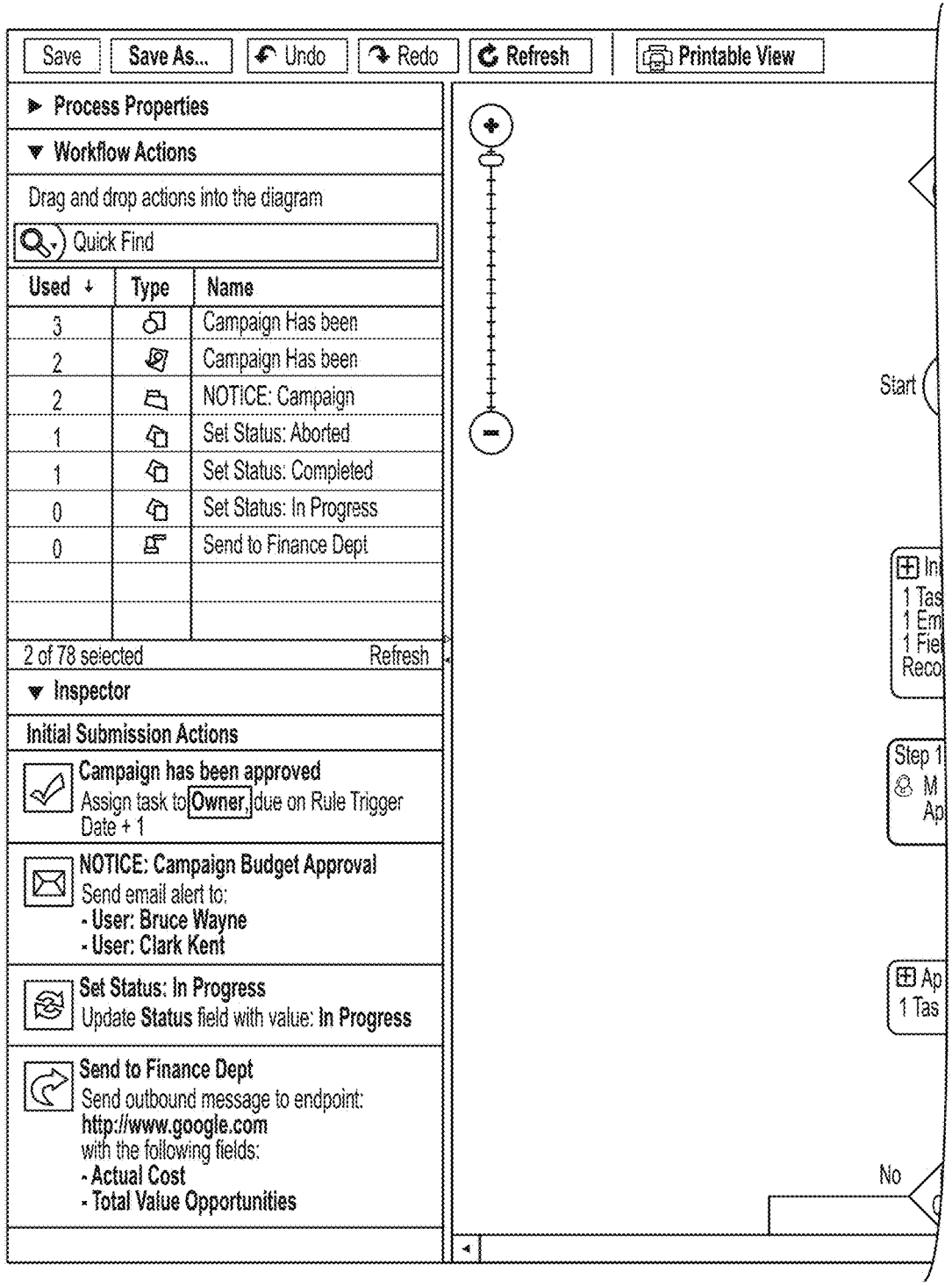
FIG. 15 shows an exemplary find functionality of a process diagram interface, in accordance with one embodiment.

In one embodiment, a find mode may be enabled for the process diagram. In one embodiment, when a user selects a find mode, a Workflow Actions pane may be disabled. In another embodiment, the find mode may operated similarly to searching, including the ability to cycle through matches, etc. In another embodiment, if a next match is found in a Process Properties pane of the process diagram and the Process Properties pane is closed, such pane may be opened. Further, in another embodiment, highlighted nodes may be selected (e.g., clicked on, etc.) to see one or more details of the nodes. In another embodiment, a sidebar of the process diagram may not be masked, and hits within the sidebar may be highlighted in yellow. Exemplary find functionality of a process diagram interface is shown in FIG. 15, in accordance with one embodiment.

Add Step

Figure 16:
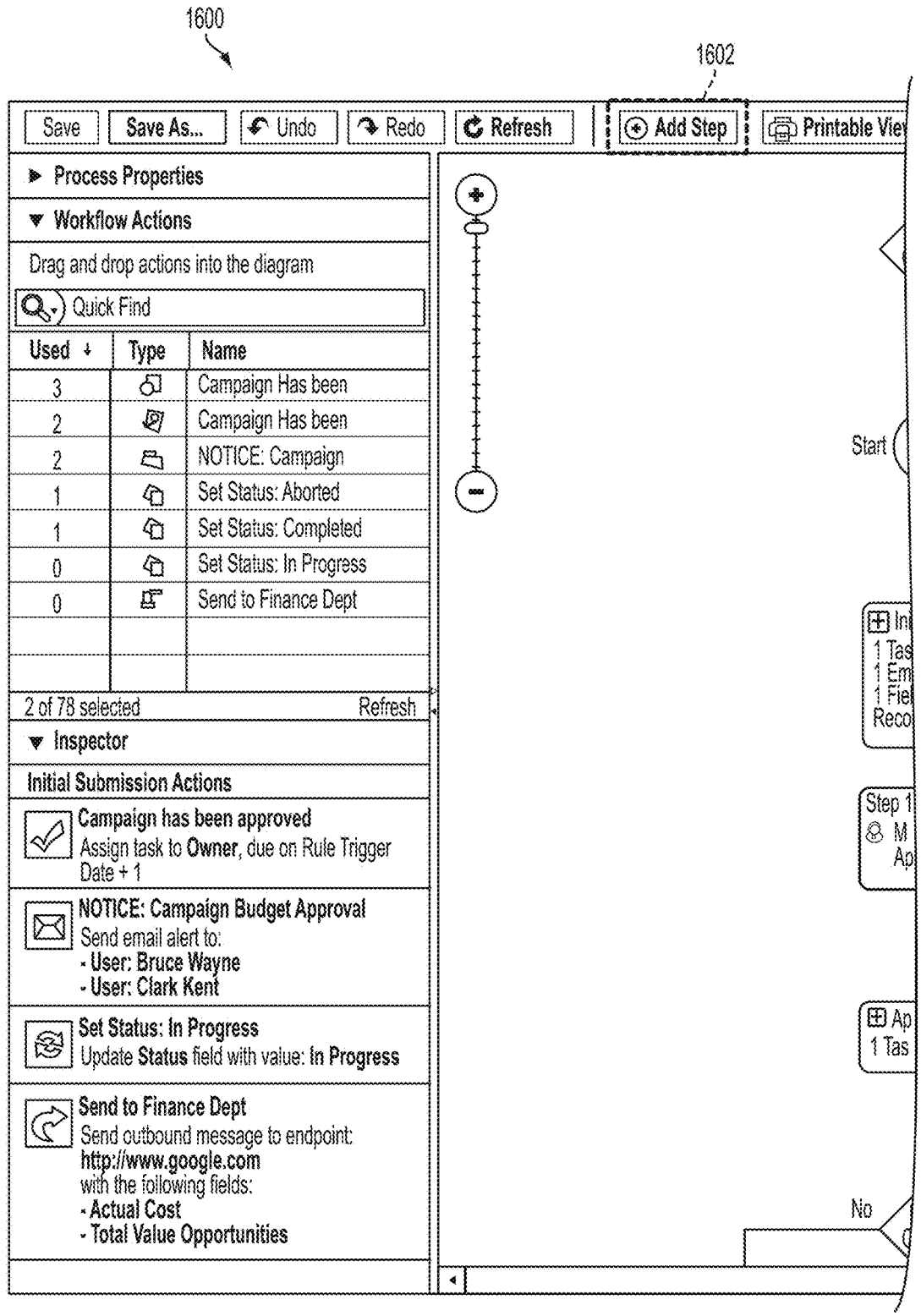
FIG. 16 shows an exemplary functionality for adding a step in a process diagram interface, in accordance with one embodiment.

In one embodiment, functionality for adding a step to the process diagram may be included in the process diagram. For example, an "Add Step" button may be added to a button bar of the process diagram. Additionally, in one embodiment, selecting the "Add Step" button may open an overlay. For example, selecting the "Add Step" button may open an overlay that is the same as an "Edit Step" overlay but with blank fields. Exemplary functionality for adding a step in a process diagram interface is shown in the exemplary process diagram interface 1600 of FIG. 16, in accordance with one embodiment. As shown, the process diagram interface 1600 includes an add step button 1602. In one embodiment, the add step button 1602 may be shown in certain circumstances, and greyed out in other circumstances. For example, the add step button 1602 may be greyed out when a process status is active. In another example, the add step button 1602 may be greyed out when a process is deactivated but was previously activated. This may be irrespective of the fact that there may be no records which refer to the process.

Figure 17:
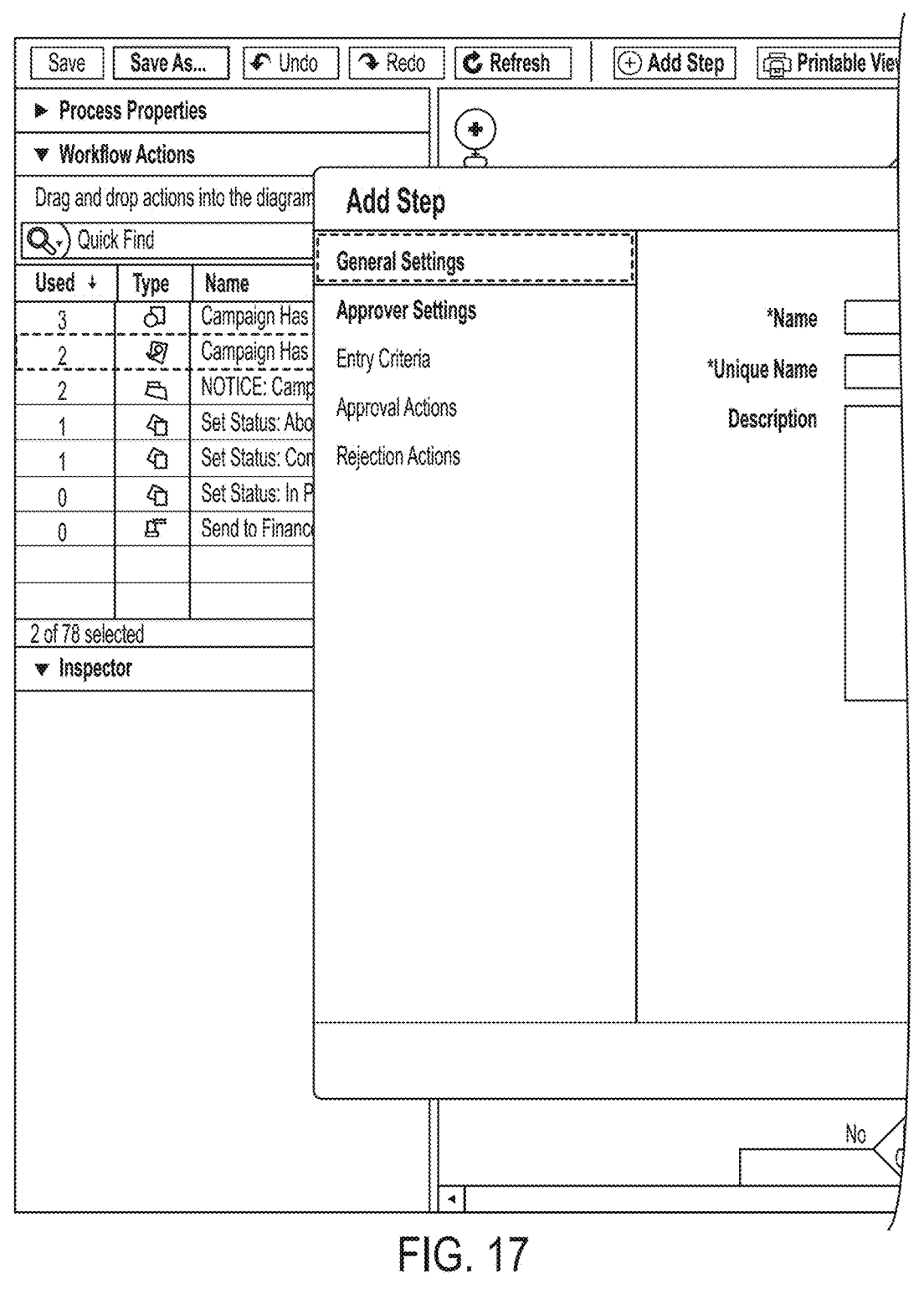

Additionally, an exemplary overlay for adding a step in a process diagram interface is shown in FIG. 17, in accordance with one embodiment. In one embodiment, a user may only reorder a new step of the process diagram. For example, other steps of the process diagram may not be selectable. Further, in one embodiment, a new step may be placed at the end of the process diagram (e.g., as a default, etc.). Further still, a user may reorder the new step by using one or more buttons (e.g., up and down buttons, etc.). In another embodiment, the user may reorder the new step by dragging it up and down in the process diagram window.

Hover Buttons

Figure 18A:
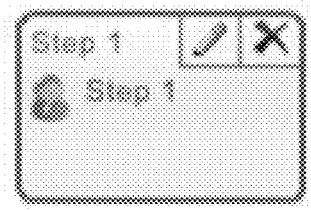
FIG. 18A shows exemplary hover options existing for a node in a process diagram interface, in accordance with one embodiment.

In one embodiment, different elements of the process diagram may react differently when a user hovers over them (e.g., using a mouse pointer, etc.). For example, upon hovering on a step, options may appear to edit or remove the step. For example, a delete option may appear that, when selected, opens a prompt that says "Are you sure you want to remove this step?" Additionally, an edit option may appear that, when selected, opens an edit overlay. In another embodiment, the edit overlay may appear when a user double-clicks on a node. Exemplary hover options existing for a node in a process diagram interface are shown in FIG. 18A, in accordance with one embodiment.

Figure 18B:
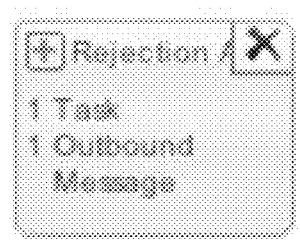
FIG. 18B shows exemplary hover options existing for an action group in a process diagram interface, in accordance with one embodiment.

In another example, upon hovering on an action group, an option may appear to remove the action group. For example, a delete option may appear that, when selected, opens a prompt that says "Are you sure you want to remove all 2 actions in this group?" Exemplary hover options existing for an action group in a process diagram interface is shown in FIG. 18B, in accordance with one embodiment.

Figure 18C:
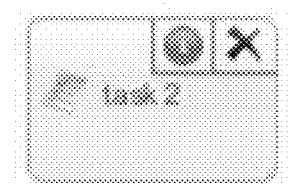
FIG. 18C shows exemplary hover options existing for an action in a process diagram interface, in accordance with one embodiment.

In yet another example, upon hovering on an action, an option may appear to remove the action group or open an overlay. For example, a delete option may appear that, when selected, deletes the action. Additionally, an overlay option may appear that, when selected, opens an action overlay for the action. In another embodiment, the action overlay may appear when a user double-clicks on the action. Exemplary hover options existing for an action in a process diagram interface are shown in FIG. 18C, in accordance with one embodiment.

Approver Settings

In one embodiment, one or more approver settings may exist for the process diagram. Additionally, these approver settings may be the same for both Add and Edit steps. In one embodiment, options to select an approver may exist as one or more radio buttons, a picklist, etc. In yet another embodiment, a default option may exist for assigning an approver. For example, a default menu selection option may include "Automatically assign to <DYNAMIC>," where the dynamic text may come from process properties, in a screenshot below its Manager. In one embodiment, the default option may show the label, and not the developer name. In another embodiment, if the process properties do not have a manager field specified, the default option may not be provided to the user.

Figure 19:
FIG. 19 shows an exemplary approver settings overlay in a process diagram interface, in accordance with one embodiment.
Figure 20:
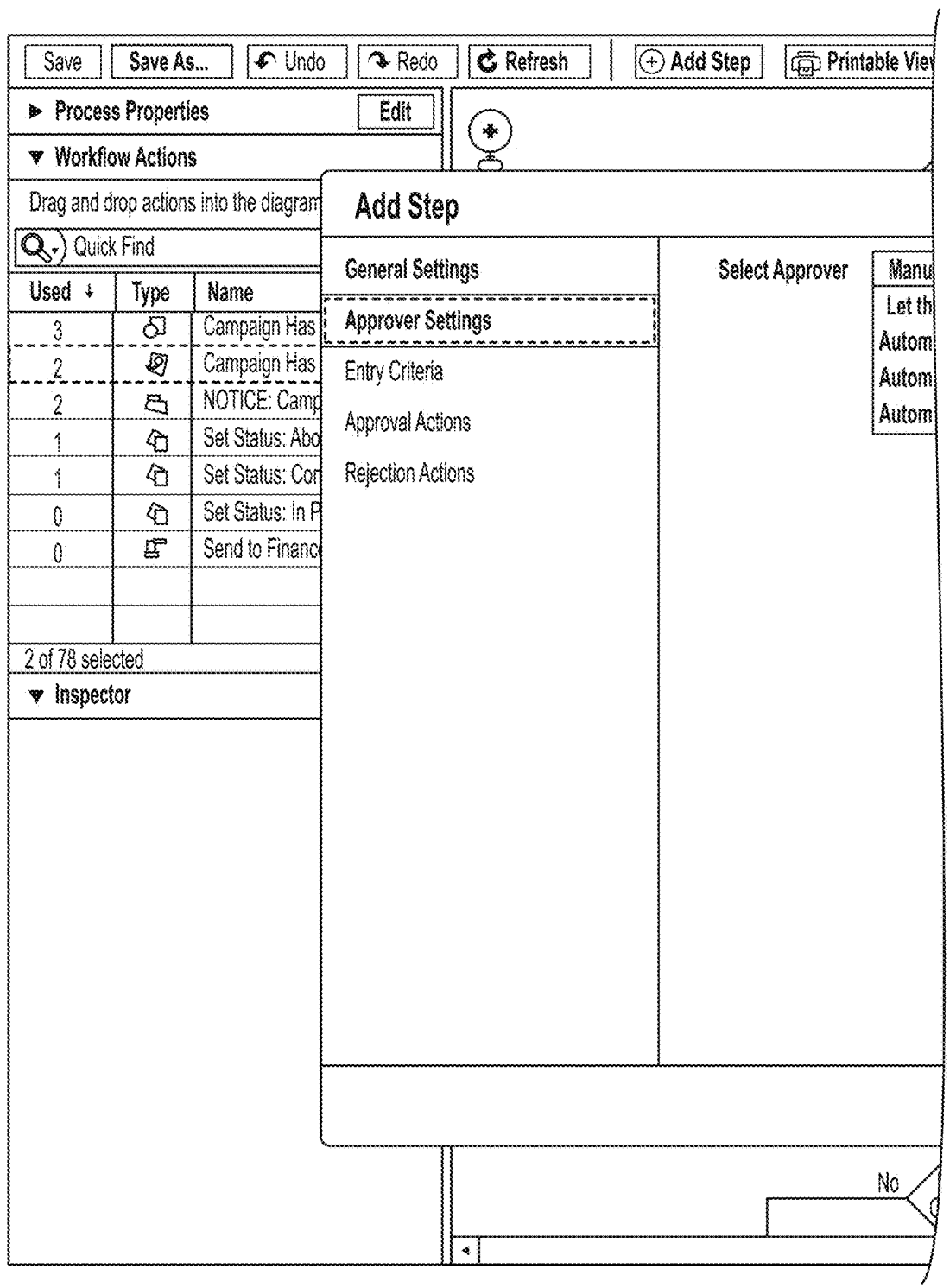
FIG. 20 shows an exemplary approver settings overlay picklist in a process diagram interface, in accordance with one embodiment.

Additionally, the above default option may be used if the process properties have the manager field specified. Otherwise, the default may be "Let the submitter chose the approver manually." Further, in one embodiment, queues may be supported. For example, if a process has a step assigned to a queue, the user may not be able to change the queue name but may be able to change the overall option. For instance, the user may be above to change the name from the queue to say "manual." In another embodiment, a name of the queue may dynamically appear on the picklist. An exemplary approver settings overlay in a process diagram interface is shown in FIG. 19, in accordance with one embodiment. Additionally, one exemplary approver settings overlay picklist in a process diagram interface is shown in FIG. 20, in accordance with one embodiment.

In another embodiment, when a user selects a "Manually select approver(s)" option on the picklist, a pane may be shown with approver settings. Additionally, the picklist may include information related to a user and related user (e.g., a user option, a related user option, etc.). Further, if a user option is selected, an autocomplete component may be shown (e.g., instead of a lookup). Further still, if a related user option is selected, another picklist may be shown with related user values. Also, an add button may be disabled until a user enters a valid user option.

In yet another embodiment, when a user types a certain number of characters, results may start to be fetched. For example, the number of characters may be one, or may be more than one in order to improve performance. Additionally, a loading message may be shown while fetching results. Further, every time a user enters another character, a new query may be initiated. In this way, results may always be accurate. Further still, search results may be based on a first character of each new word (e.g., where the word is either a first name, a last name, a role, etc.). Also, if no results are found, an alert may be made to the user indicating that no results were found.

In still another embodiment, when results exist, a grid may be shown with two columns. For example, the columns may include a full name column and role column. Additionally, the grid may be scrollable and may show a default number of records (e.g., 15-20 records), where the default may be adjusted in order to optimize the display of records. Further, there may be a cap on how many results are displayed in order to improve performance. Further still, a persistent message may exist that informs the user that a set number of records is being returned, and that a user needs to type more characters to narrow search results. Also, upon clicking on a row, the grid may be closed and a textbox may be populated with the selected entry. Further, all matches may be shown in bold.

In addition, in another embodiment, when a user clicks on an add button, the textbox may be cleared and the information to be added may be added to the box below. Further, a user may be able to add approvers by hitting a key on a keyboard (e.g., the Enter key, etc.). This may add the approver and keep the focus on the current textbox. Further still, a remove link may exist for every approver.

Also, in another embodiment, when the user selects the related user option, a picklist may be shown which contains user lookups related to the object. Additionally, when a user adds a related user, the picklist may be reverted to a null state. Further, when there are multiple approvers, multiple approver settings may be shown. In yet another embodiment, a user may be notified when they have added a maximum number of approvers.

Edit Properties

Figure 21:
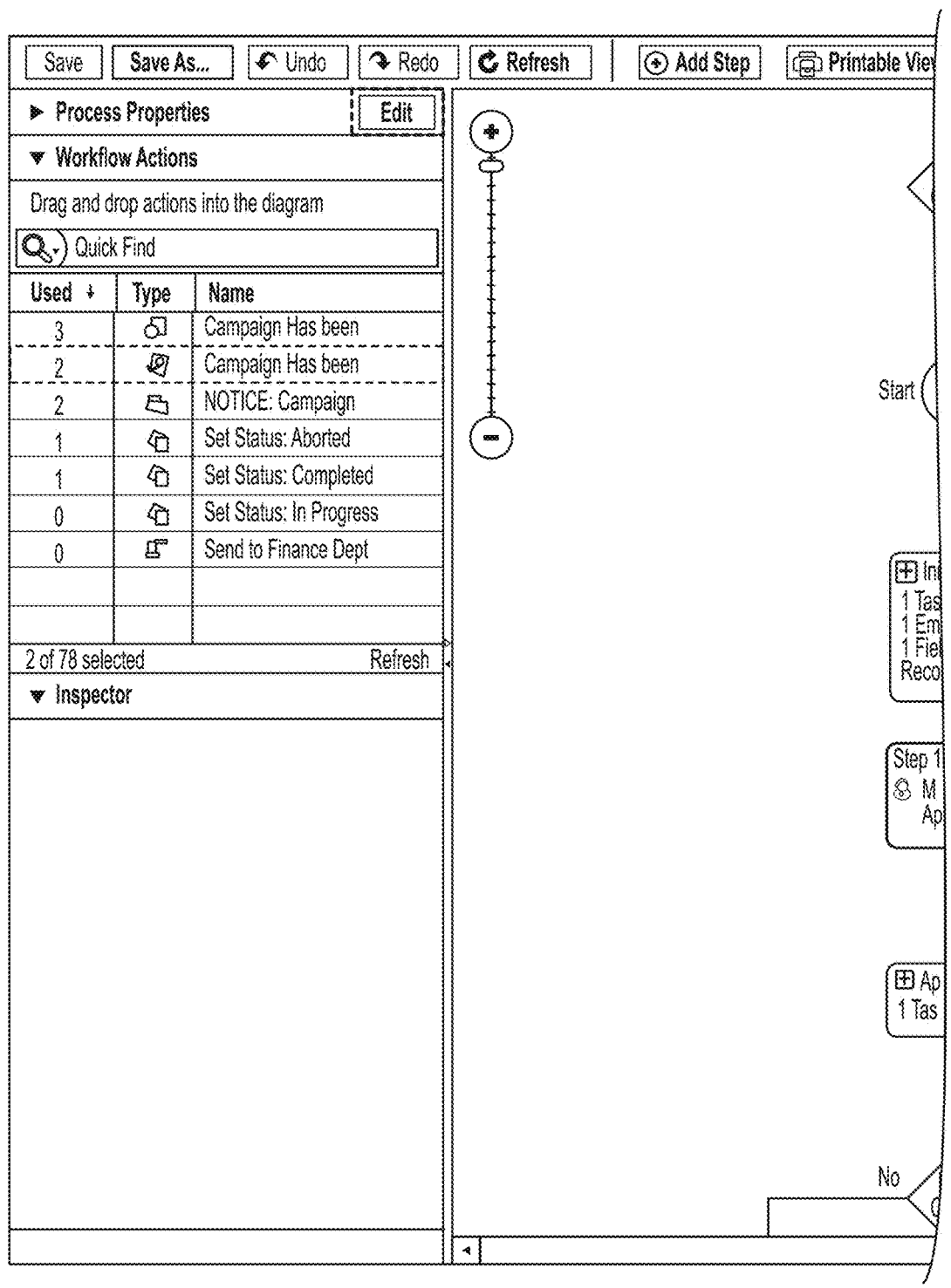
FIG. 21 shows an exemplary edit button placement in a process diagram interface, in accordance with one embodiment.
Figure 22:
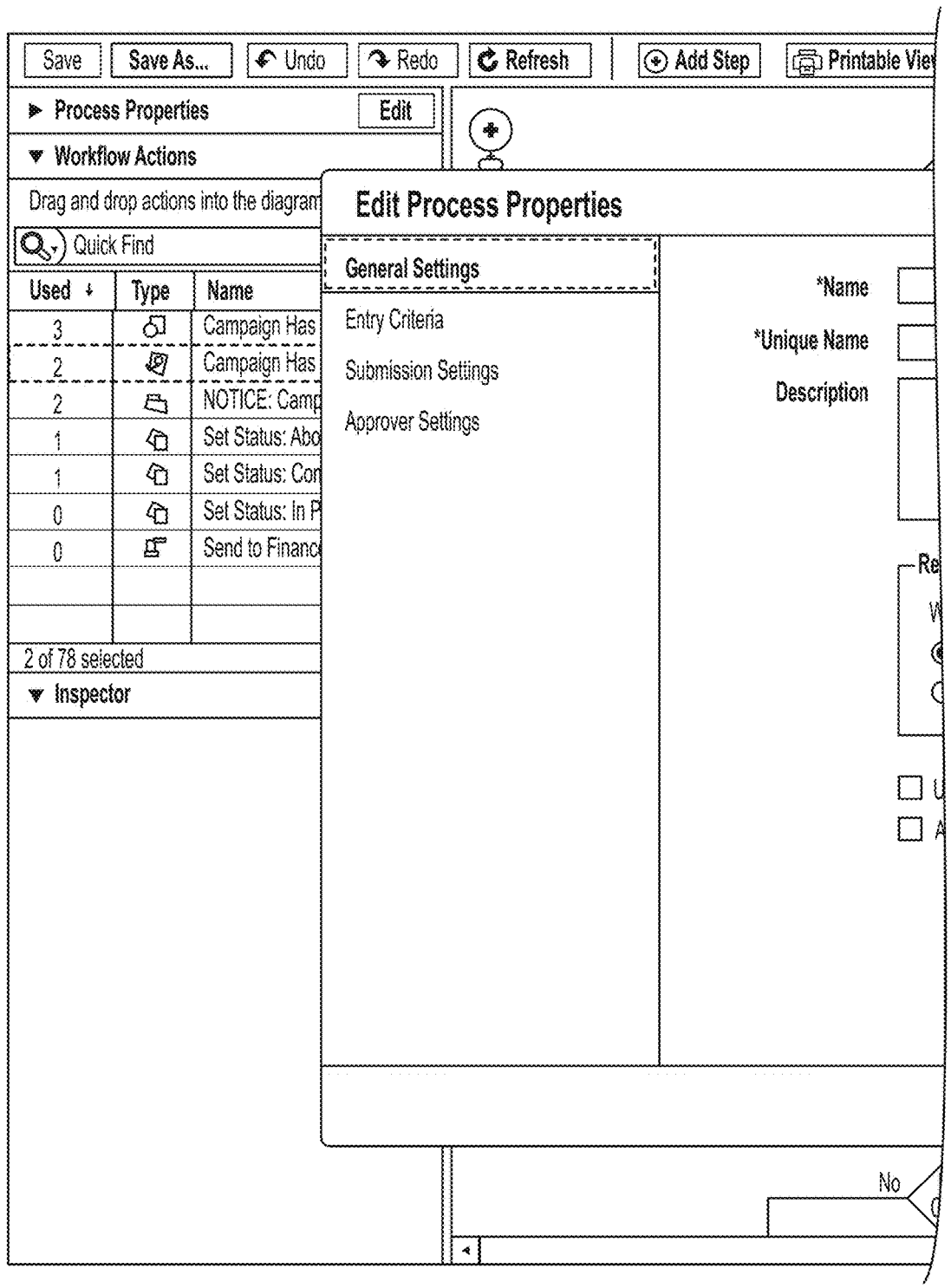
FIG. 22 shows an exemplary edit overlay in a process diagram interface, in accordance with one embodiment.

In another embodiment, an edit button may exist in the "Process Properties" portion of the sidebar. Selecting this edit button may open an overlay to perform one more edits to the process diagram. One exemplary edit button placement in a process diagram interface is shown in FIG. 21, in accordance with one embodiment. Additionally, one exemplary edit overlay in a process diagram interface is shown in FIG. 22, in accordance with one embodiment.

System Overview

Figure 23:
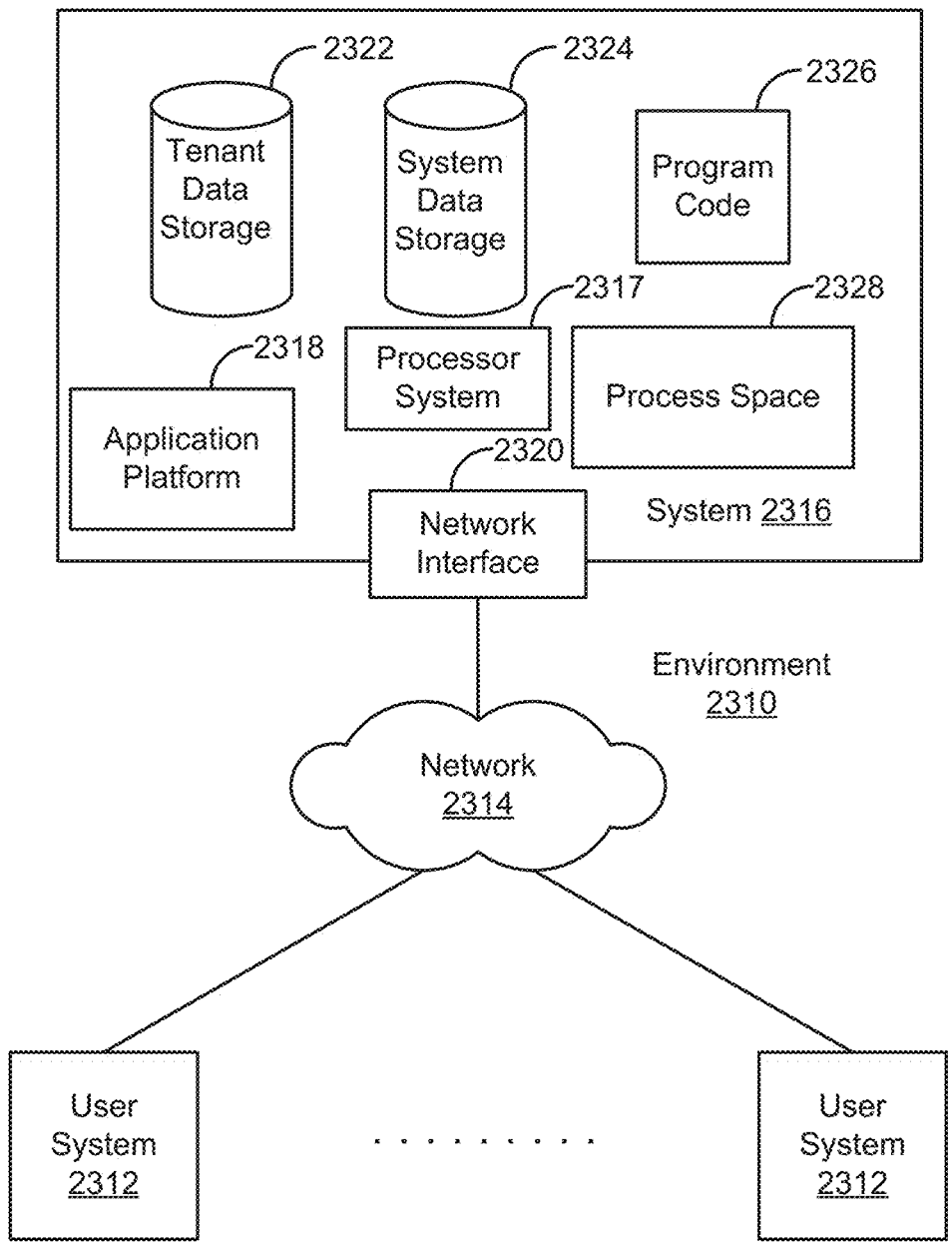
FIG. 23 illustrates a block diagram of an example of an environment wherein an on-demand database service might be used.

FIG. 23 illustrates a block diagram of an environment 2310 wherein a process diagram might be used. As an option, any of the previously described embodiments of the foregoing figures may or may not be implemented in the context of the environment 2310. Environment 2310 may include user systems 2312, network 2314, system 2316, processor system 2317, application platform 2318, network interface 2320, tenant data storage 2322, system data storage 2324, program code 2326, and process space 2328. In other embodiments, environment 2310 may not have all of the components listed and/or may have other elements instead of, or in addition to, those listed above.

Environment 2310 is an environment in which an process diagram is implemented. User system 2312 may be any machine or system that is used by a user to access a database user system. For example, any of user systems 2312 can be a handheld computing device, a mobile phone, a laptop computer, a work station, and/or a network of computing devices. As illustrated in FIG. 23 (and in more detail in FIG. 24) user systems 2312 might interact via a network with an on-demand database service, which is system 2316.

An on-demand database service, such as system 2316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2316" and "system 2316" will be used interchangeably herein. A database image may include one or more database objects. A relational database management system (RDMS) or the equivalent may execute storage and retrieval of information against the database object(s). Application platform 2318 may be a framework that allows the applications of system 2316 to run, such as the hardware and/or software, e.g., the operating system. In an embodiment, on-demand database service 416 may include an application platform 2318 that enables creation, managing and executing one or more applications developed by the provider of the on-demand database service, users accessing the on-demand database service via user systems 2312, or third party application developers accessing the on-demand database service via user systems 2312.

The users of user systems 2312 may differ in their respective capacities, and the capacity of a particular user system 2312 might be entirely determined by permissions (permission levels) for the current user. For example, where a salesperson is using a particular user system 2312 to interact with system 2316, that user system has the capacities allotted to that salesperson. However, while an administrator is using that user system to interact with system 2316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2314 is any network or combination of networks of devices that communicate with one another. For example, network 2314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 2312 might communicate with system 2316 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 2316. Such an HTTP server might be implemented as the sole network interface between system 2316 and network 2314, but other techniques might be used as well or instead. In some implementations, the interface between system 2316 and network 2314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2316, shown in FIG. 23, implements a web-based customer relationship management (CRM) system. For example, in one embodiment, system 2316 includes application servers configured to implement and execute CRM software applications as well as provide related data, code, forms, webpages and other information to and from user systems 2312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2316 implements applications other than, or in addition to, a CRM application. For example, system 2316 may provide tenant access to multiple hosted (standard and custom) applications, including a CRM application. User (or third party developer) applications, which may or may not include CRM, may be supported by the application platform 2318, which manages creation, storage of the applications into one or more database objects and executing of the applications in a virtual machine in the process space of the system 2316.

Figure 24:
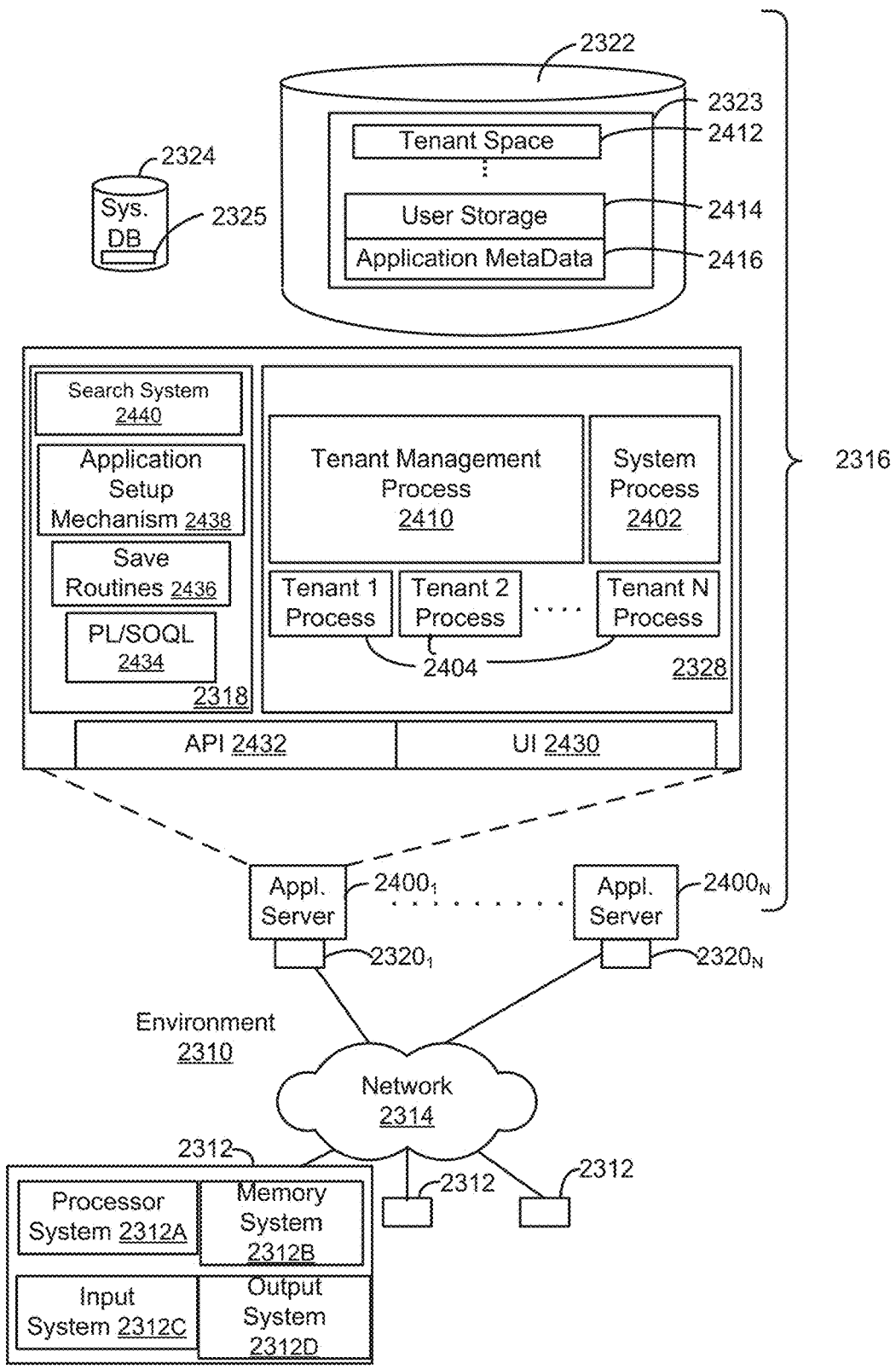
FIG. 24 illustrates a block diagram of an embodiment of elements of FIG. 4 and various possible interconnections between these elements.

One arrangement for elements of system 2316 is shown in FIG. 24, including a network interface 2320, application platform 2318, tenant data storage 2322 for tenant data 2323, system data storage 2324 for system data accessible to system 2316 and possibly multiple tenants, program code 2326 for implementing various functions of system 2316, and a process space 2328 for executing MTS system processes and tenant-specific processes, such as running applications as part of an application hosting service. Additional processes that may execute on system 2316 include database indexing processes.

Several elements in the system shown in FIG. 23 include conventional, well-known elements that are explained only briefly here. For example, each user system 2312 could include a desktop personal computer, workstation, laptop, PDA, cell phone, or any wireless access protocol (WAP) enabled device or any other computing device capable of interfacing directly or indirectly to the Internet or other network connection. User system 2312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 2312 to access, process and view information, pages and applications available to it from system 2316 over network 2314. Each user system 2312 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 2316 or other systems or servers. For example, the user interface device can be used to access data and applications hosted by system 2316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2312 and all of its components are operator configurable using applications, such as a browser, including computer code run using a central processing unit such as an Intel Pentium® processor or the like. Similarly, system 2316 (and additional instances of an MTS, where more than one is present) and all of their components might be operator configurable using application(s) including computer code to run using a central processing unit such as processor system 2317 of FIG. 23, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 2316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 2316 is configured to provide webpages, forms, applications, data and media content to user (client) systems 2312 to support the access by user systems 2312 as tenants of system 2316. As such, system 2316 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 24 also illustrates environment 2310. However, in FIG. 5A-FIG. 5E elements of system 2316 and various interconnections in an embodiment are further illustrated. FIG. 5A-FIG. 5E shows that user system 2312 may include processor system 2312A, memory system 2312B, input system 2312C, and output system 2312D. FIG. 5A-FIG. 5E shows network 2314 and system 2316. FIG. 5A-FIG. 5E also shows that system 2316 may include tenant data storage 2322, tenant data 2323, system data storage 2324, system data 2325, User Interface (UI) 2430, Application Program Interface (API) 2432, PL/SOQL 2434, save routines 2436, application setup mechanism 2438, applications servers $2400_1$-$2400_N$, system process space 2402, tenant process spaces 2404, tenant management process space 2410, tenant storage area 2412, user storage 2414, and application metadata 2416. In other embodiments, environment 2310 may not have the same elements as those listed above and/or may have other elements instead of, or in addition to, those listed above.

User system 2312, network 2314, system 2316, tenant data storage 2322, and system data storage 2324 were discussed above in FIG. 23. Regarding user system 2312, processor system 2312A may be any combination of one or more processors. Memory system 2312B may be any combination of one or more memory devices, short term, and/or long term memory. Input system 2312C may be any combination of input devices, such as one or more keyboards, mice, trackballs, scanners, cameras, and/or interfaces to networks. Output system 2312D may be any combination of output devices, such as one or more monitors, printers, and/or interfaces to networks. As shown by FIG. 24, system 2316 may include a network interface 2320 (of FIG. 23) implemented as a set of HTTP application servers 2400, an application platform 2318, tenant data storage 2322, and system data storage 2324. Also shown is system process space 2402, including individual tenant process spaces 2404 and a tenant management process space 2410. Each application server 2400 may be configured to tenant data storage 2322 and the tenant data 2323 therein, and system data storage 2324 and the system data 2325 therein to serve requests of user systems 2312. The tenant data 2323 might be divided into individual tenant storage areas 2412, which can be either a physical arrangement and/or a logical arrangement of data. Within each tenant storage area 2412, user storage 2414 and application metadata 2416 might be similarly allocated for each user. For example, a copy of a user's most recently used (MRU) items might be stored to user storage 2414. Similarly, a copy of MRU items for an entire organization that is a tenant might be stored to tenant storage area 2412. A UI 2430 provides a user interface and an API 2432 provides an application programmer interface to system 2316 resident processes to users and/or developers at user systems 2312. The tenant data and the system data may be stored in various databases, such as one or more Oracle™ databases.

Application platform 2318 includes an application setup mechanism 2438 that supports application developers' creation and management of applications, which may be saved as metadata into tenant data storage 2322 by save routines 2436 for execution by subscribers as one or more tenant process spaces 2404 managed by tenant management process 2410 for example. Invocations to such applications may be coded using PL/SOQL 2434 that provides a programming language style interface extension to API 2432. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 2416 for the subscriber making the invocation and executing the metadata as an application in a virtual machine.

Each application server 2400 may be communicably coupled to database systems, e.g., having access to system data 2325 and tenant data 2323, via a different network connection. For example, one application server $2400_1$ might be coupled via the network 2314 (e.g., the Internet), another application server $2400_{N-1}$ might be coupled via a direct network link, and another application server $2400_N$ might be coupled by yet a different network connection. Transfer Control Protocol and Internet Protocol (TCP/IP) are typical protocols for communicating between application servers 2400 and the database system. However, it will be apparent to one skilled in the art that other transport protocols may be used to optimize the system depending on the network interconnect used.

In certain embodiments, each application server 2400 is configured to handle requests for any user associated with any organization that is a tenant. Because it is desirable to be able to add and remove application servers from the server pool at any time for any reason, there is preferably no server affinity for a user and/or organization to a specific application server 2400. In one embodiment, therefore, an interface system implementing a load balancing function (e.g., an F5 Big-IP load balancer) is communicably coupled between the application servers 2400 and the user systems 2312 to distribute requests to the application servers 2400. In one embodiment, the load balancer uses a least connections algorithm to route user requests to the application servers 2400. Other examples of load balancing algorithms, such as round robin and observed response time, also can be used. For example, in certain embodiments, three consecutive requests from the same user could hit three different application servers 2400, and three requests from different users could hit the same application server 2400. In this manner, system 2316 is multi-tenant, wherein system 2316 handles storage of, and access to, different objects, data and applications across disparate users and organizations.

As an example of storage, one tenant might be a company that employs a sales force where each salesperson uses system 2316 to manage their sales process. Thus, a user might maintain contact data, leads data, customer follow-up data, performance data, goals and progress data, etc., all applicable to that user's personal sales process (e.g., in tenant data storage 2322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 2316 might also maintain system level data usable by multiple tenants or other data. Such system level data might include industry reports, news, postings, and the like that are sharable among tenants.

In certain embodiments, user systems 2312 (which may be client systems) communicate with application servers 2400 to request and update system-level and tenant-level data from system 2316 that may require sending one or more queries to tenant data storage 2322 and/or system data storage 2324. System 2316 (e.g., an application server 2400 in system 2316) automatically generates one or more SQL statements (e.g., one or more SQL queries) that are designed to access the desired information. System data storage 2324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   providing, by a computer system, information that is executable by a client computer system to:
      display a graphical user interface operable to receive user input indicative of a process diagram for a process, wherein the user input includes data that is indicative of a plurality of steps of the process, wherein the user input indicates an ordered relationship between the plurality of steps, and wherein the plurality of steps includes an approval step that is associated with an approval entity and an additional step that, if taken, circumvents the approval step; and
      output a graphical representation of the process diagram, wherein the graphical representation includes:
         graphical indications of each of the plurality of steps; and
         a disclaimer indicating that the approval step can be circumvented via the additional step;
      receive, via a search component of the graphical user interface, a search query; and
      perform a search of the process diagram based on the search query, such that graphical indications corresponding to steps that do not meet the search query become non-interactive while the search query is active; and
   generating, by the computer system, data and executable code corresponding to the process diagram, wherein the data and executable code is usable by a process diagram engine to facilitate performing the process such that, responsive to the approval step being entered, the computer system causes an approval request to be sent to the approval entity.

2. The method of claim 1, wherein the user input is further indicative of a selection of the approval entity from a plurality of entities.

3. The method of claim 1, wherein the ordered relationship between the plurality of steps depends on whether the approval entity approves the approval step.

4. The method of claim 1, wherein the at least one of the graphical indications displays a name of the approval entity.

5. The method of claim 1, wherein the graphical indications of each of the plurality of steps indicates a respective state of each step.

6. The method of claim 1, wherein the user input indicates that the ordered relationship is non-deterministic at a time the user input is received such that the ordered relationship is contingent upon approval of the approval step by the approval entity.

7. The method of claim 1, wherein character values of the search query are received on a character-by-character basis, and wherein graphical indications corresponding to steps that meet the character values are highlighted as the character values are received on a character-by-character basis.

8. The method of claim 1, wherein when a graphical indication that corresponds to a step that meets the search query is selected by a user, a sidebar is provided that displays details about the step, and when a graphical indication that corresponds to a step that does not meet the search query is selected, the sidebar is not provided.

9. The method of claim 1, wherein the search component is operable to receive user input indicative of a filter criterion, wherein application of the filter criterion causes only a subset of steps to be searched for the search query.

10. The method of claim 1, wherein the information is further executable to:
   prevent a user from providing more than a maximum number of approval entities to be associated with the approval step.

11. A non-transitory computer-readable medium having computer instructions stored thereon that are capable of being executed by a computer system to cause operations comprising:
   providing information that is executable by a client computer system to:
      display a graphical user interface operable to receive user input indicative of a process diagram for a process, wherein the user input includes data that is indicative of a plurality of steps of the process, wherein the user input indicates an ordered relationship between the plurality of steps, and wherein the plurality of steps includes an approval step that is associated with an approval entity and an additional step that, if taken, circumvents the approval step; and
      output a graphical representation of the process diagram, wherein the graphical representation includes:
         graphical indications of each of the plurality of steps; and
         a disclaimer indicating that the approval step can be circumvented via the additional step; and receive, via a search component of the graphical user interface, a search term; and perform a search of the process diagram for the search term, such that graphical indications corresponding to steps that do not meet the search term become non-interactive while the search component is being utilized; and generating data and executable code corresponding to the process diagram, wherein the data and executable code is usable by a process diagram engine to facilitate performing the process such that, responsive to the approval step being entered, the computer system causes an approval request to be sent to the approval entity.

12. The non-transitory computer-readable medium of claim 11, wherein the graphical user interface includes an approver field configured to receive input that designates the approval entity.

13. The non-transitory computer-readable medium of claim 11, wherein the operations further comprise receiving, via the graphical user interface, configurable approver settings, wherein the configurable approver settings includes a designation of a default option for assigning an approval entity.

14. The non-transitory computer-readable medium of claim 11, further comprising receiving, at the computer system and via the graphical user interface, an indication that a step has been selected for incorporation into the plurality of steps.

15. The non-transitory computer-readable medium of claim 14, wherein the selected step is selected via the graphical user interface and is dragged into the process diagram.

16. The non-transitory computer-readable medium of claim 11, wherein the graphical user interface includes a process properties panel configured to display one or more properties associated with the process diagram.

17. The non-transitory computer-readable medium of claim 16, wherein providing the process properties panel is responsive to receiving information indicating that one of the plurality of steps has been selected.

18. A non-transitory computer-readable medium having computer instructions stored thereon that are capable of being executed by a computer system to cause operations comprising:

providing information that is executable by a client computer system to:

display a graphical user interface operable to receive user input indicative of a process diagram for a process, wherein the user input includes data that is indicative of a plurality of steps of the process, wherein the plurality of steps includes an approval step that is associated with an approval entity and an additional step that, if taken, circumvents the approval step, and wherein the user input indicates an ordered relationship between the plurality of steps that is contingent upon approval of the approval step by the approval entity; and output a graphical representation of the process diagram, wherein the graphical representation includes:

graphical indications of each of the plurality of steps; and a warning indicating that the approval step can be circumvented via the additional step;

receive, via a search component of the graphical user interface, a search query; and perform a search of the process diagram for the search query, such that graphical indications corresponding to steps that do not meet the search query become non-interactive while the search query is active; and generating data and executable code corresponding to the process diagram, wherein the data and executable code is usable by a process diagram engine to facilitate performing the process such that, responsive to the approval step being entered, the computer system causes an approval request to be sent to the approval entity; and responsive to receiving a response from the approval entity, providing information to the process diagram engine that determines a step subsequent to the approval step.

19. The non-transitory computer-readable medium of claim 18, wherein the receiving the user input includes receiving a selection via a picklist displayed within the graphical user interface of the approval entity, wherein the picklist includes a plurality of entities that are candidates for selection as the approval entity.

20. The non-transitory computer-readable medium of claim 18, wherein the operations further comprise:

causing a plurality of additional steps to be displayed on the client computer system via the graphical user interface; and responsive to receiving an indication that one of the additional steps has been selected, adding the selected additional step to the process diagram.

* * * * *